(12) United States Patent
Loessl et al.

(10) Patent No.: US 11,154,020 B2
(45) Date of Patent: Oct. 26, 2021

(54) APPARATUS FOR GROWING PLANTS, AND IRRIGATION APPARATUS OF THE APPARATUS FOR GROWING PLANTS

(71) Applicant: Agrilution GmbH, Munich (DE)

(72) Inventors: Maximilian Loessl, Munich (DE); Philipp Wagner, Fuerstenfeldbruck (DE)

(73) Assignee: AGRILUTION SYSTEMS GMBH, Munich (DE)

( * ) Notice: Subject to any disclaimer, the term of this patent is extended or adjusted under 35 U.S.C. 154(b) by 317 days.

(21) Appl. No.: 16/256,092

(22) Filed: Jan. 24, 2019

(65) Prior Publication Data
US 2019/0223396 A1 Jul. 25, 2019

(30) Foreign Application Priority Data
Jan. 25, 2018 (DE) ...................... 10 2018 101 697.2

(51) Int. Cl.
| | | |
|---|---|---|
| *A01G 31/06* | (2006.01) | |
| *A01G 27/00* | (2006.01) | |
| *A01G 24/44* | (2018.01) | |
| *A01C 23/04* | (2006.01) | |
| *C02F 1/32* | (2006.01) | |

(Continued)

(52) U.S. Cl.
CPC ............ *A01G 31/06* (2013.01); *A01C 23/042* (2013.01); *A01G 24/44* (2018.02); *A01G 27/003* (2013.01); *A01G 27/008* (2013.01); *C02F 1/325* (2013.01); *A01G 2031/006* (2013.01); *C02F 2103/26* (2013.01)

(58) Field of Classification Search
CPC .. A01G 31/06; A01G 2031/006; A01G 24/44; A01G 27/003; A01G 27/008; A01G 31/02; A01G 27/005; A01G 27/006; A01G 27/02; A01G 27/06; A01G 9/14; A01G 9/16; A01G 9/20; A01G 9/24; A01G 9/246; A01G 9/247; A01G 9/26; A01G 9/249; A01G 7/045; A01C 1/02; A01C 1/044

See application file for complete search history.

(56) References Cited

U.S. PATENT DOCUMENTS

| | | | |
|---|---|---|---|
| 2,928,211 A * | 3/1960 | Martin | .................. A01G 31/06 47/60 |
| 5,493,808 A * | 2/1996 | Munday | ................. A01G 9/246 47/60 |

(Continued)

FOREIGN PATENT DOCUMENTS

| | | |
|---|---|---|
| CN | 103733971 | 4/2014 |
| DE | 102015118059 | 4/2017 |

*Primary Examiner* — Trinh T Nguyen
(74) *Attorney, Agent, or Firm* — Barnes & Thornburg LLP; Jeffrey R. Stone

(57) ABSTRACT

In various embodiments, an apparatus for growing plants is provided. The apparatus may include an irrigation apparatus, an accommodating space for accommodating one or more seed mats, and a controller which is configured to control the irrigation apparatus by a program controller. The irrigation apparatus includes a water circuit system for feeding water to the seed mats. The water circuit system includes at least one inlet, a water tank, at least one water circuit pump and at least one outlet. The irrigation apparatus includes a sensor which is configured to determine a conductance of the fed water.

20 Claims, 13 Drawing Sheets

(51) Int. Cl.
*A01G 31/00* (2018.01)
*C02F 103/26* (2006.01)

(56) References Cited

U.S. PATENT DOCUMENTS

| | | | | |
|---|---|---|---|---|
| 8,234,812 | B1* | 8/2012 | Colless | A01G 9/16 47/61 |
| 8,910,419 | B1* | 12/2014 | Oberst | A01G 31/06 47/60 |
| 2007/0220808 | A1* | 9/2007 | Kaprielian | A01G 27/003 47/48.5 |
| 2014/0115958 | A1* | 5/2014 | Helene | A01G 31/06 47/17 |
| 2016/0371830 | A1* | 12/2016 | Barrasso | H05B 45/20 |
| 2017/0280643 | A1* | 10/2017 | Ankner | A01G 22/00 |
| 2017/0347547 | A1* | 12/2017 | Lu | G08B 21/18 |
| 2019/0200542 | A1* | 7/2019 | Hall | A01G 29/00 |

* cited by examiner

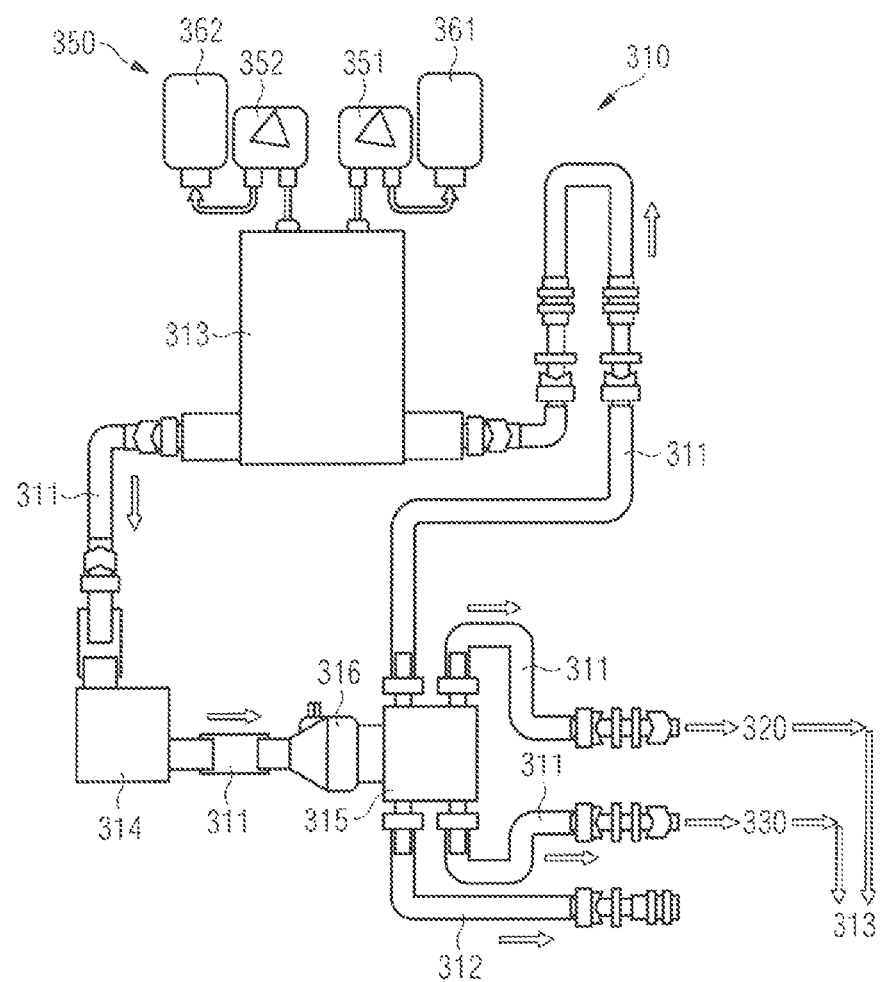

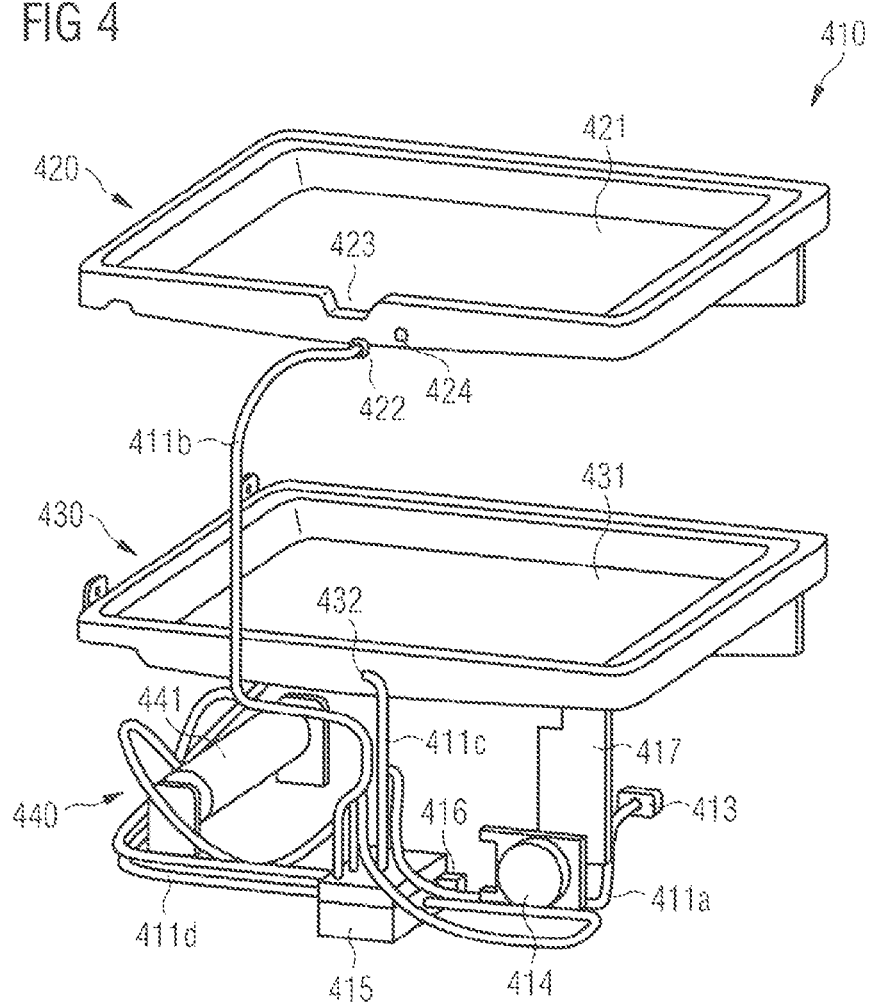

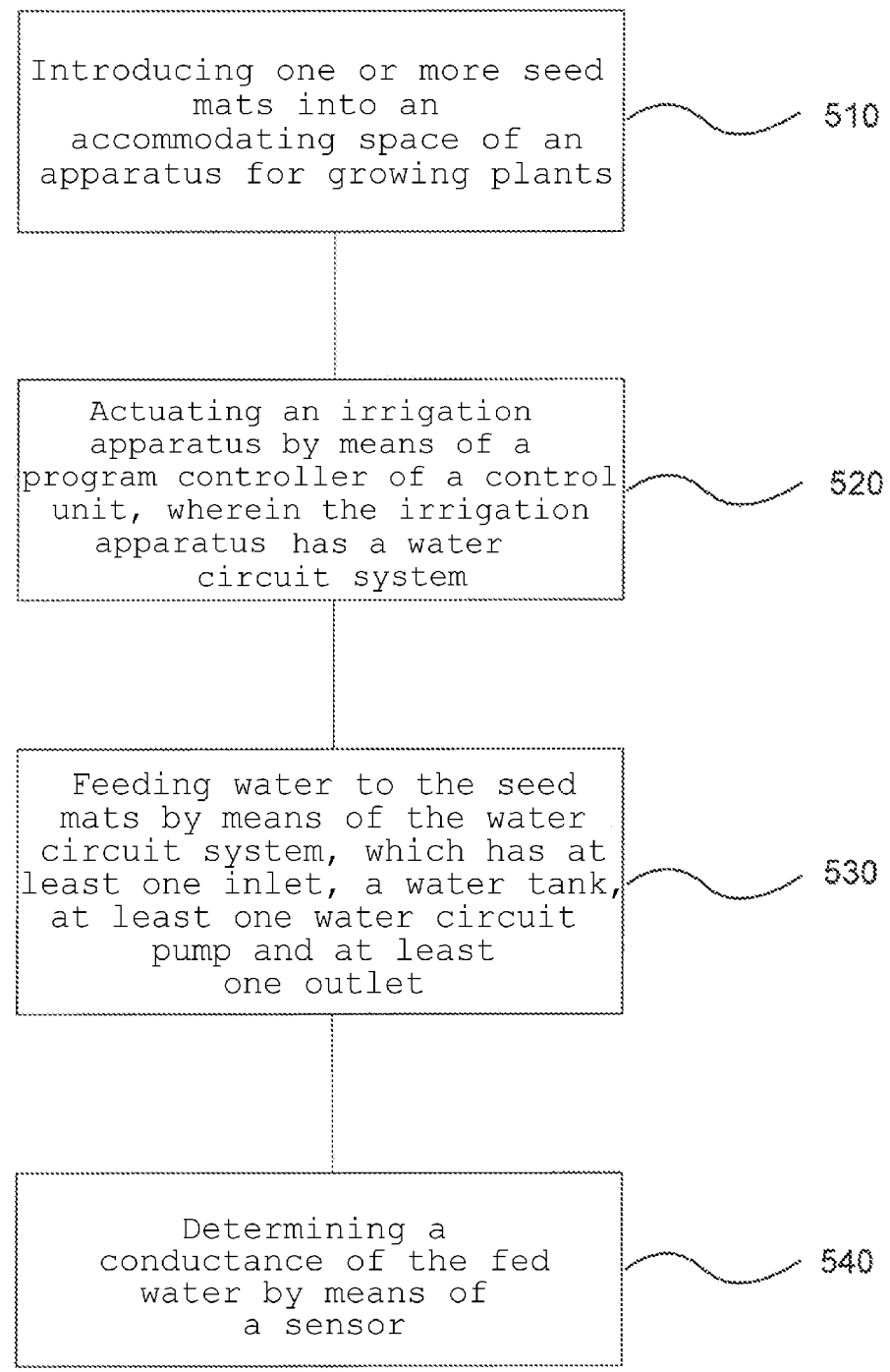

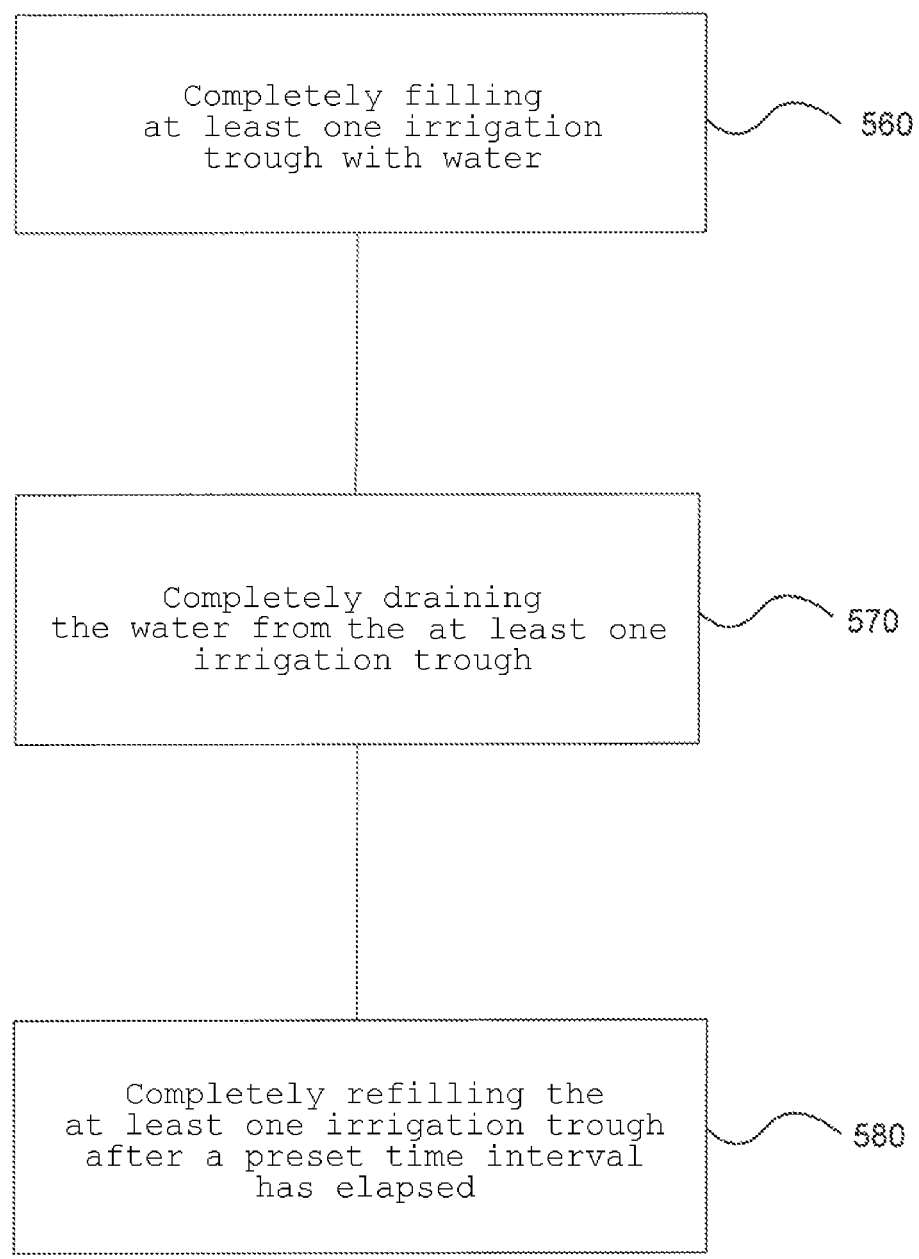

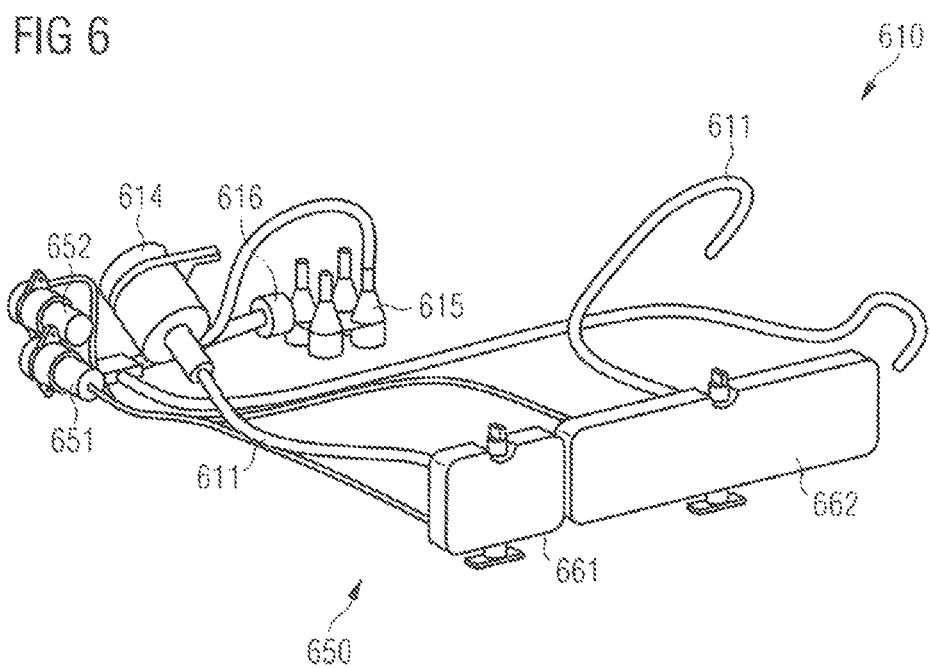

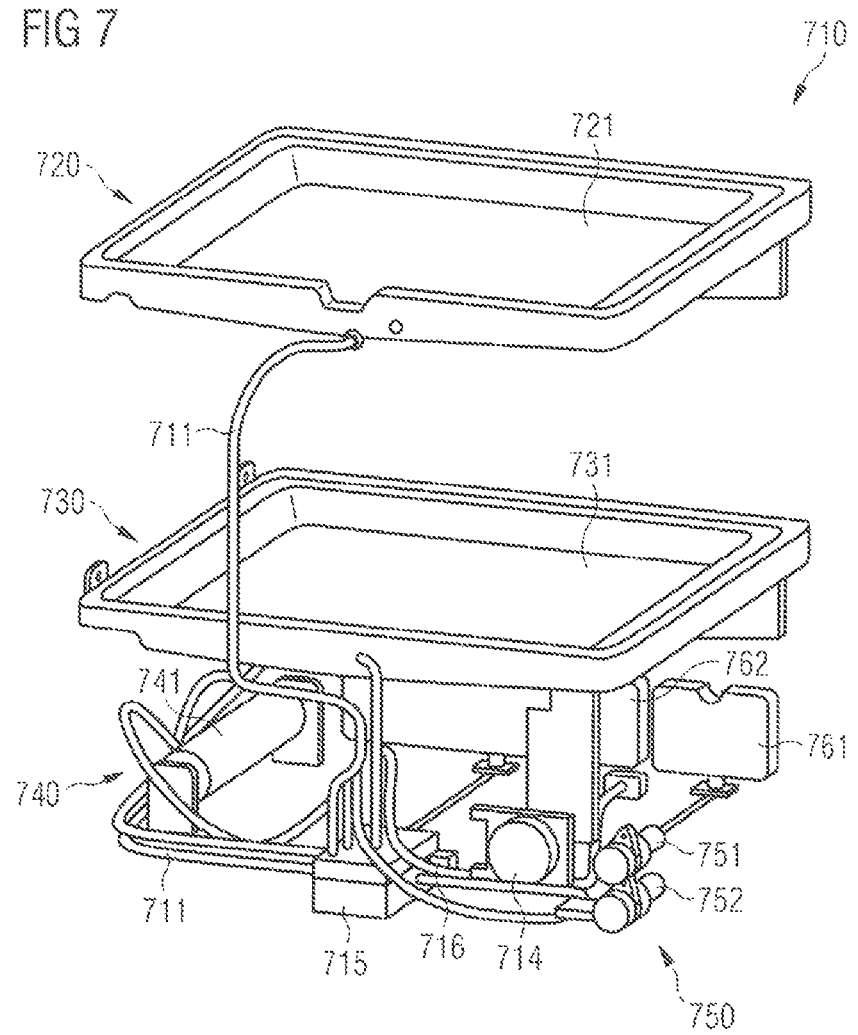

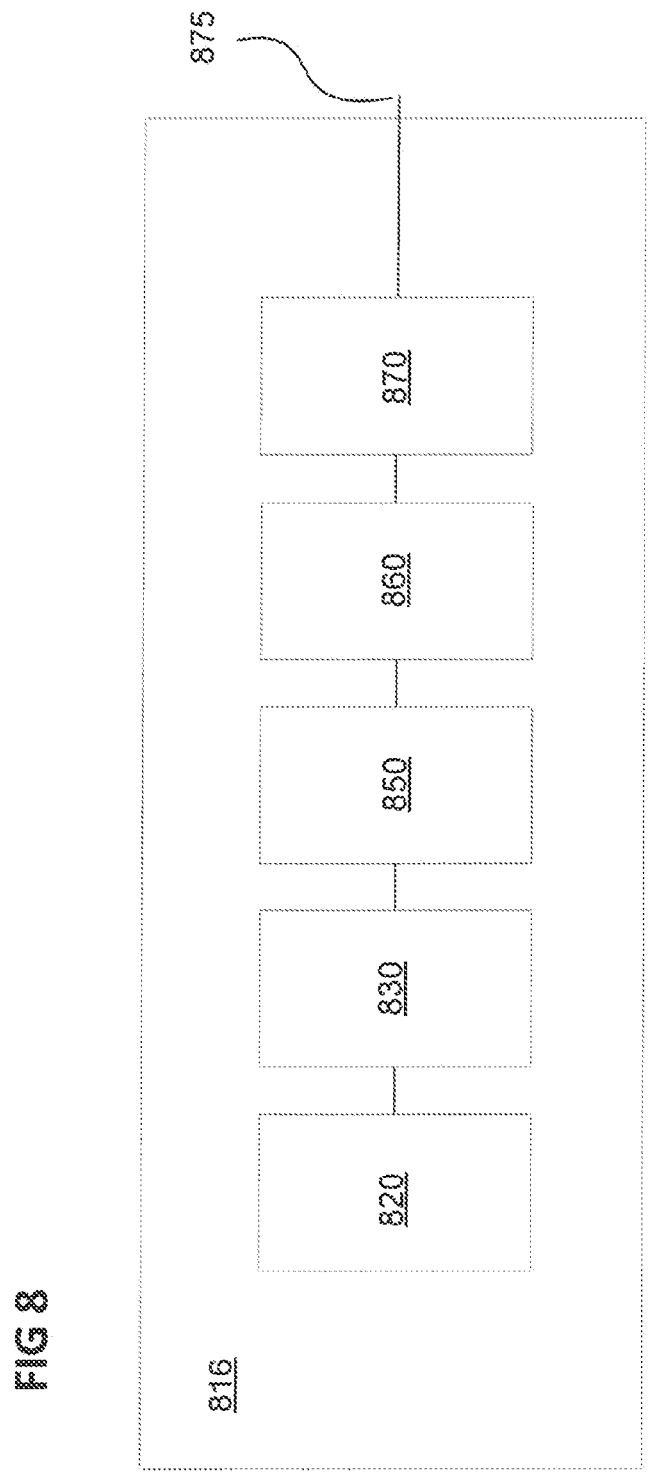

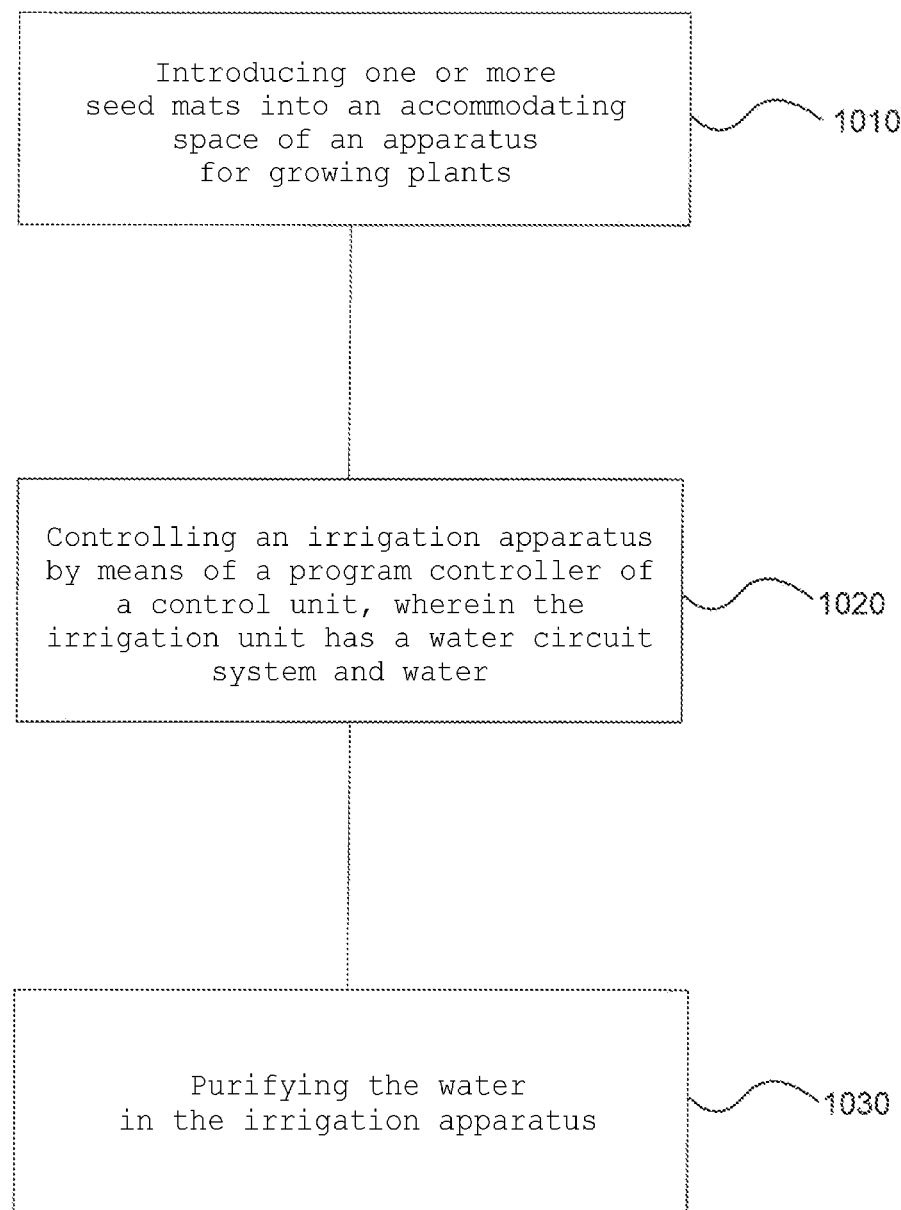

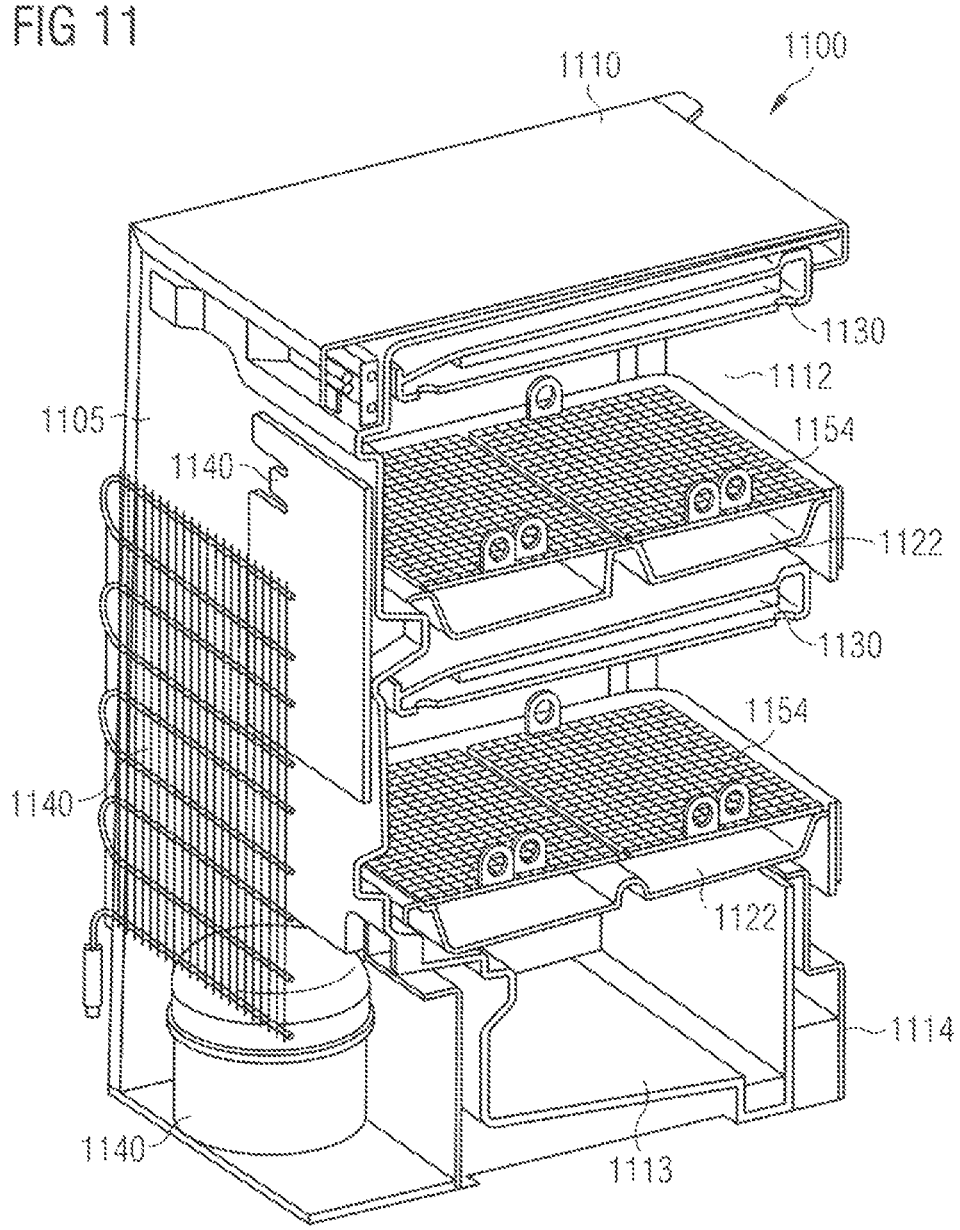

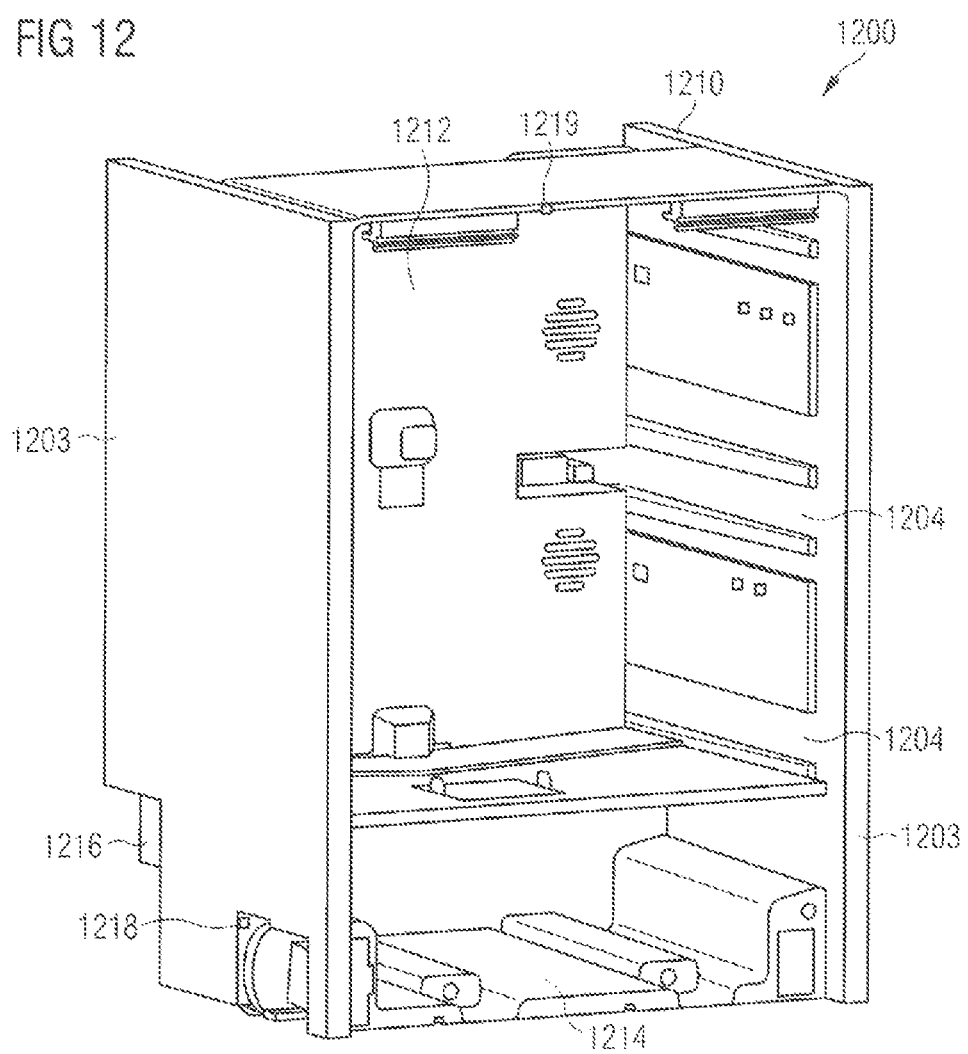

APPARATUS FOR GROWING PLANTS, AND IRRIGATION APPARATUS OF THE APPARATUS FOR GROWING PLANTS

CROSS-REFERENCE TO RELATED APPLICATION

This application claims priority to German Patent Application Serial No. 10 2018 101 697.2, which was filed Jan. 25, 2018, and is incorporated herein by reference in its entirety.

TECHNICAL FIELD

Various embodiments relate generally to an apparatus for growing plants, and relate e.g. to an irrigation apparatus of the apparatus for growing plants and to a method for growing plants.

BACKGROUND

In the field of the provision of fresh products such as for example herbs, salad, fruit and vegetables, consumer demands have grown to an increasing extent in recent years. In particular since the denunciation of abuses in the husbandry of animals for slaughter, and the increasing prevalence of vegetarian or vegan foods, the awareness of many consumers of fresh products, and their demand for these, has increased.

These products have hitherto for the most part been produced either on fields or in greenhouses of large industrial operations and brought to the consumers by being sold in supermarkets. To a lesser extent, the consumers also obtain a supply directly from the producer at weekly markets and from direct selling on farms, wherein these distribution channels are available only to a relatively small part of the population owing to the restricted time availability or the required spatial proximity to the producer.

With the increased awareness of large parts in particular of the urban population with regard to their own health, there is, specifically in this case, an increasingly growing demand for products from controlled cultivation, and even the desire for personal control and meaningful engagement in the cultivation of one's own, correspondingly fresh products.

However, only a very small part of the urban population has access to a garden or corresponding facilities in which, for example, they could set up their own small greenhouses in order to cultivate fresh products. Also, the urban environment seldom offers the possibility of handling planting boxes and pots without relatively great organizational effort, let alone providing the plants cultivated therein firstly with the required protection against weather influences and secondly with adequate sunlight in order to promote the desired growth of the plants.

Furthermore, specifically the urban population commonly has a daily routine involving working away from home and often long traveling distances to and from the workplace, such that there is no desire, aside from everything else, to also tend to the growth of plants, to monitor this growth, and to adapt the care of these plants to the respective growth phase.

Owing to all these difficulties, many people who would in fact gladly benefit from cultivating their own plants and harvesting their own products are put off by the effort that the cultivation of these plants entails. They are put off even more by the feeling that there is a very low likelihood that, after all the effort, fresh ingredients from one's own cultivation will in fact be worthwhile, because, in hectic urban everyday life, it is not possible to ensure care of the plants which is sufficiently optimal that it leads to good results.

In terms of the informed consumer who intentionally wishes to eat healthily and at the same time is intent on achieving sustainability but has neither the space nor the time to cultivate plants in the conventional manner, it is thus desirable to create a means with which even small consumers, such as for example the typical modern single urban resident, can independently supply themselves with fresh food ingredients to the desired extent.

In the context of these demands, an apparatus has recently been proposed with the aid of which even individual consumers can, on a small scale adapted to common kitchen sizes, grow herbs, salads, vegetables or fruit.

A particular problem in growing such plants is that they must constantly be supplied with water and nutrients, wherein the demand for both of these varies from one plant type to another and over the course of the germination and growth of the plants. Here, the quality and composition of the irrigation water must be constantly monitored and regulated. Here, a substantial automation of the supply to the plants in the growing apparatus is desirable. Furthermore, under the conditions required for plant growth in the apparatus for growing plants, for example with regard to illumination and warmth, there is the risk of the simultaneous growth of bacteria, fungi and algae in the supply lines, which can have an adverse effect on the plant growth.

SUMMARY

In various embodiments, an apparatus for growing plants is provided. The apparatus may include an irrigation apparatus, an accommodating space for accommodating one or more seed mats, and a controller which is configured to control the irrigation apparatus by a program controller. The irrigation apparatus includes a water circuit system for feeding water to the seed mats. The water circuit system includes at least one inlet, a water tank, at least one water circuit pump and at least one outlet. The irrigation apparatus includes a sensor which is configured to determine a conductance of the fed water.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a schematic illustration of a water circuit system for feeding water and nutrients to the plants according to various embodiments;

FIG. 4 shows an illustration of the water circuit system for feeding water according to various embodiments;

FIG. 5A shows a flow diagram of a method for growing plants according to various embodiments;

FIG. 5B shows a flow diagram of the feed of water to and drainage of water from the irrigation troughs by means of the irrigation apparatus of the method for growing plants according to various embodiments;

FIG. 6 shows an illustration of an apparatus for feeding nutrients of the irrigation apparatus according to various embodiments;

FIG. 7 shows an overview illustration of the irrigation apparatus with the apparatus for feeding nutrients according to various embodiments;

FIG. 8 shows a schematic illustration of a sensor for determining a conductance of the water in the water circuit system according to various embodiments;

FIG. 10 shows a flow diagram of a method for growing plants according to various embodiments;

FIG. 11 shows a cross-sectional view of the apparatus for growing plants according to various embodiments from a lateral perspective; and FIG. 12 shows a cross-sectional view of the apparatus for growing plants according to various embodiments from a frontal perspective.

DESCRIPTION

The following detailed description refers to the accompanying drawings that show, by way of illustration, specific details and embodiments in which the invention may be practiced.

In the detailed description that follows, reference is made to the appended drawings, which form a part of this description and which, for illustrative purposes, show specific embodiments in which the invention can be implemented. In this regard, directional terminology such as for example "upward", "downward", "forward", "rearward", "front", "rear" etc. is used in relation to the orientation of the described figure(s). Since components of embodiments may be positioned in a number of different orientations, the directional terminology serves for illustrative purposes and is in no way restrictive. It is self-evident that other embodiments may be utilized and structural or logical modifications made without departing from the scope of protection of the present invention. It is self-evident that the features of the various embodiments described herein may be combined with one another unless specifically stated otherwise. The following detailed description therefore should not be considered in a restrictive sense, and the scope of protection of the present invention is defined by the appended claims.

In the context of this description, the expressions "connected", "attached" and "coupled" are used to describe both a direct and an indirect connection, a direct or indirect attachment, and a direct or indirect coupling. In the figures, identical or similar elements are denoted by identical reference symbols where expedient.

Figure 1:
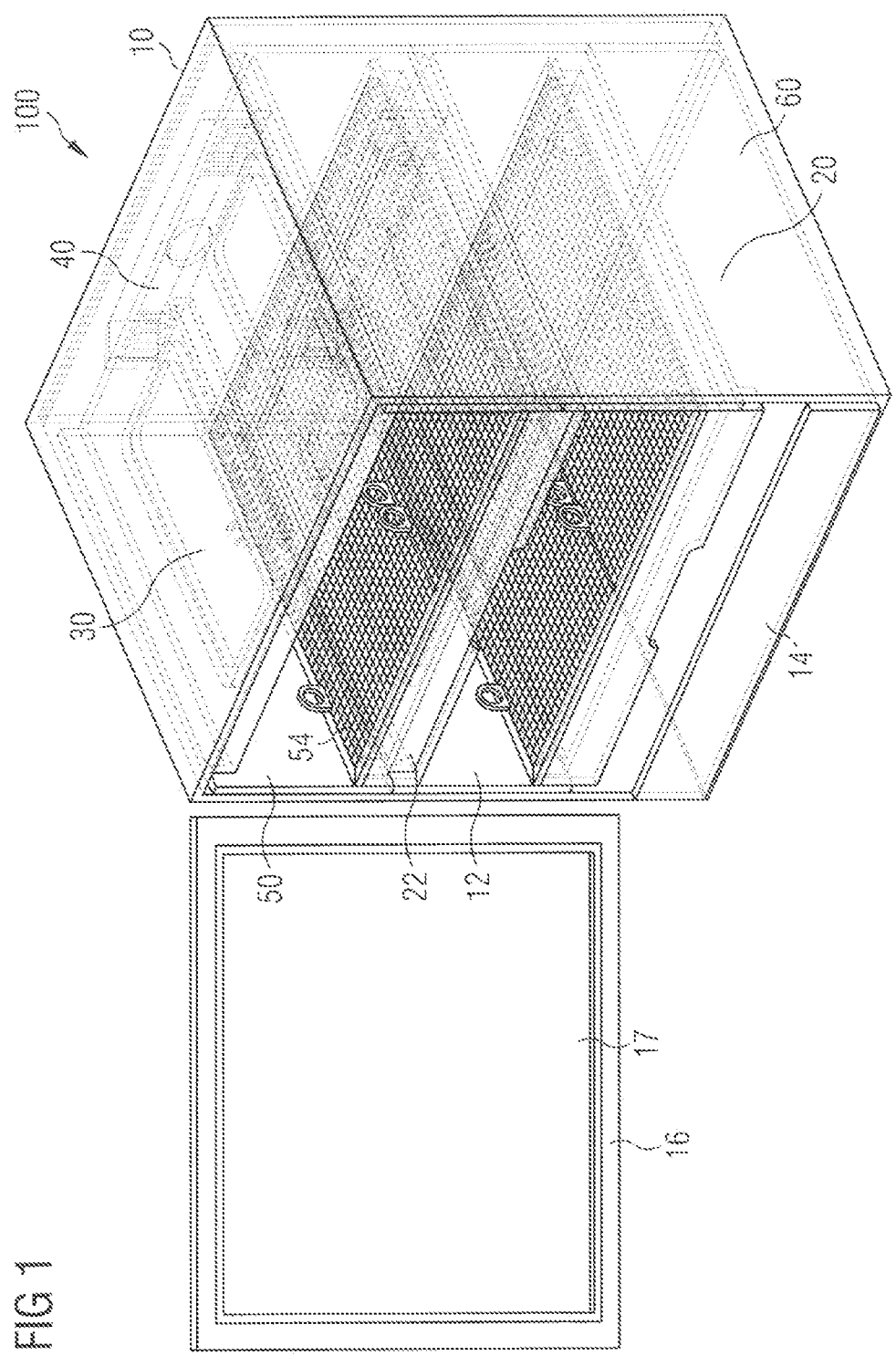
FIG. 1 shows an apparatus for growing plants according to various embodiments.

An apparatus for growing plants according to various embodiments is illustrated in FIG. 1.

As illustrated in FIG. 1, the apparatus for growing plants may include a cabinet-like housing 10 which may be equipped with an accommodating space 12, a base 14 and a door 16, which may include an observation opening 17. Furthermore, the apparatus may include an irrigation apparatus 20 and at least one illumination apparatus 30. Furthermore, in the apparatus, there may be provided a control unit 60, which may be accommodated in the base 14 of the apparatus, wherein the control unit 60 may actuate the illumination apparatus 30 and the irrigation apparatus 20 by means of a program controller. The apparatus for growing plants may furthermore include a climate control device 40.

Depending on the size of the apparatus, one or more growing units 50 of drawer-like form can be introduced into the accommodating space 12 of the apparatus for growing plants. The growing units 50 may each include an irrigation trough 22 and one or more mat carriers 54, and will be described with reference to FIG. 2A to FIG. 2D.

Figure 2C:
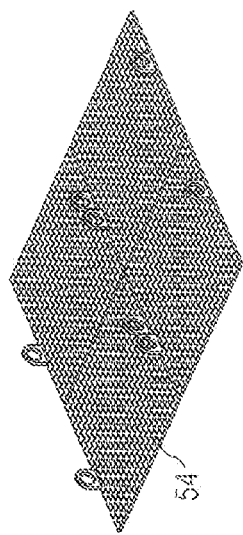
FIG. 2C shows a mat carrier for insertion onto an irrigation trough according to various embodiments.
Figure 2D:
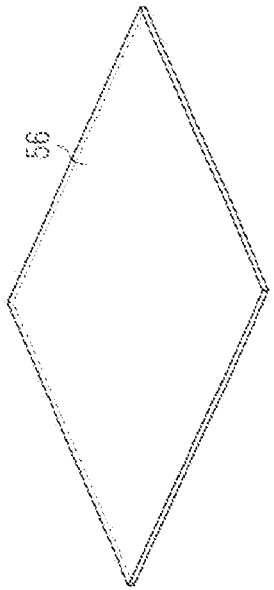
FIG. 2D shows a seed mat for placing onto a mat carrier according to various embodiments.
Figure 2A:
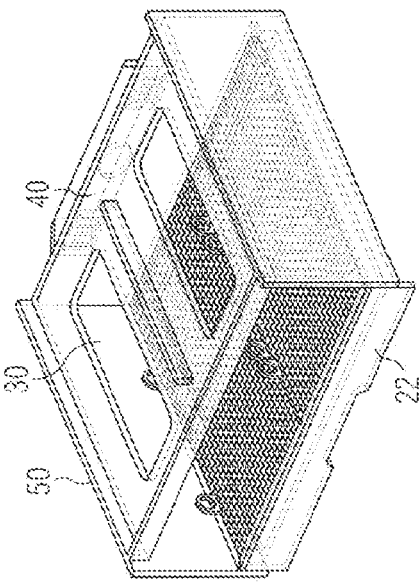
FIG. 2A shows a growing unit for introduction into the apparatus for growing plants according to various embodiments.
Figure 2B:
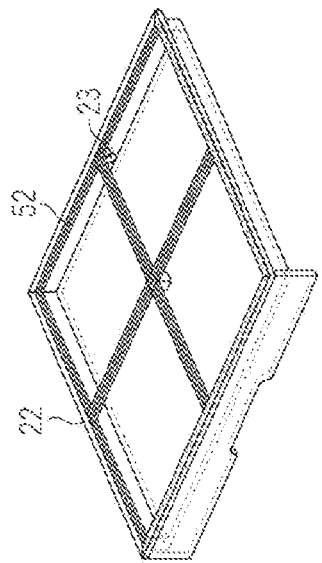
FIG. 2B shows an irrigation trough of a growing unit according to various embodiments.

FIG. 2A shows a growing unit for introduction into the apparatus for growing plants according to various embodiments. FIG. 2B shows an irrigation trough of a growing unit according to various embodiments. FIG. 2C shows a mat carrier for insertion onto an irrigation trough according to various embodiments. FIG. 2D shows a seed mat for placing onto a mat carrier according to various embodiments.

As illustrated in FIG. 2A, each growing unit 50 may be composed of an irrigation trough 22 with the associated illumination apparatus 30 arranged above said irrigation trough. Here, each growing unit 50 may define a storey, so to speak, into which plants can be introduced into the accommodating space 12 of the apparatus and grown there. For the introduction of plants into the accommodating space 12, as illustrated in FIG. 2B, each of the irrigation troughs 22 may include a subdivided frame-like structure which may form one to four placement openings 52. One to four mat carriers 54 (FIG. 2C) of different size can be placed onto the frame-like structure of the placement openings 52, which mat carriers may in turn be equipped with corresponding seed mats 56 (FIG. 2D). Furthermore, each irrigation trough 22 may include a water inlet and outlet 23.

According to various embodiments, the water required for plant growth may be admitted into and removed from the irrigation trough 22 via the water inlet and outlet 23 (see FIG. 2B). For this purpose, an irrigation apparatus according to various embodiments, for example the irrigation apparatus 20 (see FIG. 1), may include a water circuit system.

FIG. 3 is a schematic illustration of a water circuit system for feeding water and nutrients to the plants according to various embodiments.

It is to be noted that, in various embodiments, elements, components, materials, effects, dimensions, spacings etc. of apparatuses or parts thereof described in conjunction with FIG. 3 to FIG. 12 may correspond to those described in conjunction with FIG. 1 and FIG. 2. The same applies, with regard to elements, components, materials, effects, dimensions, spacings etc. of apparatuses or parts thereof described and discussed in conjunction with any of FIG. 3 to FIG. 12, for embodiments described with reference to any of the other figures. A repetition can thus be omitted, and the elements, components, materials, effects, dimensions, spacings etc. may be provided with the same reference symbols. It is furthermore to be noted that the list of the stated materials of all of the described elements is not exhaustive, but rather further materials may be used if the use thereof is expedient.

The water circuit system 310 schematically illustrated in FIG. 3 may include a line system composed of lines 311 and lines 312, through which water may be pumped by means of a water circuit pump 314 and a (distributor) valve 315 from a water tank 313 to the water inlet 23 or from the water outlet 23 of the irrigation trough 22 (see FIG. 2B). Flow direction of the water in the water circuit system 310 is indicated in FIG. 3 by means of arrows arranged adjacent to the lines 311 and to the lines 312.

The water circuit pump 314 may for example have a pump capacity in a range from approximately 0 l/min to approximately 20 l/min, for example in a range from approximately 2 l/min to approximately 15 l/min, for example in a range from approximately 4 l/min to approximately 10 l/min. The water tank 313 may for example hold a volume of water in a range from approximately 12 l to approximately 25 l, optionally from approximately 15 l to approximately 23 l, optionally from approximately 17 l to approximately 20 l. An irrigation trough 22 may for example hold a volume in a range from approximately 5 l to approximately 10 l, optionally from approximately 6 l to approximately 9 l, optionally from approximately 7 l to approximately 8 l.

The line system composed of lines 311, 312 may for example have lines composed of hose material, such as for example plastic, rubber, composite materials, metal and/or glass, and/or a composite of these materials.

The lines of the line system may for example have an inner diameter in a range from approximately 5 mm to approximately 20 mm, for example in a range from approximately 7 mm to approximately 18 mm, for example in a range from approximately 9 mm to approximately 15 mm.

The line system may furthermore include further valves, connectors, connecting pieces, reduction pieces and other elements that are common for the assembly of line systems.

The (distributor) valve 315 may be designed as a four-way valve 315.

In various embodiments, the water circuit system 310 may be configured such that the water present in the water tank 313 is fed by means of the water circuit pump 314 and the valve 315 through the lines 311 to at least one individual circuit 320, 330. The at least one individual circuit 320, 330 will be described in detail with reference to FIG. 4 and FIG. 7. Furthermore, the water circuit system 310 may be configured such that the water is fed to a further individual circuit (not illustrated) through the line 312 or such that the water is drained from the water circuit system 310 through the line 312. The at least one individual circuit 320, 330 may furthermore be configured such that the fed water is returned to the water tank 313 again.

Furthermore, in various embodiments, the water circuit system 310 of the irrigation apparatus 20 may include an apparatus for feeding nutrients 350, as illustrated in FIG. 3. The apparatus for feeding nutrients 350 may be configured to feed nutrients and/or salts to the water in the water circuit system 310 of the irrigation apparatus 20. For example, the apparatus for feeding nutrients 350 may be configured to feed mineral and/or organic nutrients, such as for example mineral and/or organic fertilizers, and/or acids and/or bases, to the water in the water circuit system 310.

As is also schematically illustrated in FIG. 3, for this purpose, the water circuit system 310 of the irrigation apparatus 20 according to various embodiments may include one or more pumps 351, 352, which may be designed as peristaltic pumps 351, 352. Here, each of the pumps 351, 352 may be coupled to a respective storage container 361, 362 such that the respective pump 351, 352 may add a liquid stored in the corresponding storage container 361, 362 to the water circulated by pumping in the water circuit system 310.

For example, the pumps 351, 352 may be coupled to the water circuit system 310 such that the liquids stored in the storage containers 361, 362 are fed via the water tank 313 to the water circulated by pumping in the water circuit system 310, or such that the liquids stored in the storage containers 361, 362 are fed via the lines 311, 312.

For example, a first pump 351 may be connected to a first storage container 361 in which a nutrient solution, e.g. a mineral and/or organic fertilizer, may be stored. For example, the first pump 351 may be connected to the first storage container 361 in which the mineral fertilizer may be stored, or the first pump 351 may be connected to the first storage container 361 in which the organic fertilizer may be stored. Alternatively, the apparatus for feeding nutrients 350 may include two pumps 351, 352 and two storage containers 361, 362, wherein, for example, the storage container 361 stores mineral fertilizer and the storage container 362 stores organic fertilizer.

Furthermore, the second pump 352 may be connected to the second storage container 362, wherein an acid and/or base may be stored in the second storage container 362. Alternatively, the second pump 352, which is coupled to the second storage container 362, and a third pump (not illustrated), which is connected to a third storage container (not illustrated), may have, wherein an acid may be stored in the second storage container 362 and a base may be stored in the third storage container (not illustrated). As a further alternative, the first pump 351 may be connected to the first storage container 361 in which the mineral fertilizer may be stored, the second pump 352 may be connected to the second storage container 362 in which the organic fertilizer may be stored, the third pump (not illustrated) may be connected to the third storage container (not illustrated) in which the acid may be stored, and a fourth pump (not illustrated) may be connected to a fourth storage container (not illustrated) in which the base may be stored.

The control unit 60 (see FIG. 1) may be configured to actuate the irrigation apparatus 20 such that water from the water tank 313 is fed to the one or more irrigation troughs 22, which are respectively arranged under the seed mats 56. For this purpose, the water circuit system 310 may include one or more individual circuits. For example, the water circuit system 310 may include a first individual circuit 320 and a second individual circuit 330. The water circuit system 310 is however not restricted to the individual circuits 320, 330, but rather may include further individual circuits (not illustrated). The feed of water to the irrigation troughs 22 by means of the water circuit system of the irrigation apparatus 20 will be described in more detail with reference to FIG. 4.

The control unit 60 may furthermore be configured to control the pumps 351, 352 of the apparatus for feeding nutrients 350 such that nutrients from the storage containers 361, 362 are fed to the water in the water circuit system 310. This will be described in more detail with reference to FIG. 6.

Furthermore, as illustrated in FIG. 3, the water circuit system 310 may include a sensor 360. The sensor 360 may be configured to determine certain measured values, wherein the control unit 60 may be configured to receive the measured values from the sensor 360 and control a composition of the water using the measured values. The sensor 360 will be described in more detail with reference to FIG. 8.

FIG. 4 is an illustration of the water circuit system for feeding water according to various embodiments.

As illustrated in FIG. 4, in various embodiments, the water circuit system 410 of the irrigation apparatus 20 may include one to several individual circuits 420, 430 and 440. As already described above with reference to FIG. 3, the water circuit system 410 may include one or more lines 411, a water tank (not illustrated), a water circuit pump 414, a valve 415 (for example a distributor valve 415), a first sensor 416 and a second sensor 417.

The water circuit pump 414 may for example have a pump capacity in a range from approximately 0 l/min to approximately 20 l/min, for example in a range from approximately 2 l/min to approximately 15 l/min, for example in a range from approximately 4 l/min to approximately 10 l/min. The water tank (not illustrated) may for example hold a volume of water in a range from approximately 12 l to approximately 25 l, optionally from approximately 15 l to approximately 23 l, optionally from approximately 17 l to approximately 20 l.

A first water circuit 420 (or in other words a first individual circuit 420) of the water circuit system 410 may be provided for filling a first irrigation trough 421 of a first growing unit 50 (not illustrated), wherein the first growing unit 50 may provide or form an upper storey in the apparatus. Furthermore, a second water circuit 430 (or in other words a second individual circuit 430) may be provided for filling a second irrigation trough 431 of a second growing unit 50 (not illustrated), wherein the second growing unit 50 may provide or form a lower storey in the apparatus. Alternatively, the first growing unit 50 with the first irrigation trough may provide a lower storey in the apparatus, and the second growing unit 50 with the second irrigation trough may provide an upper storey in the apparatus (not illustrated).

Here, as discussed above with reference to FIGS. 2A-2D, in each of the growing units 50, one to four mat carriers 54 (not illustrated) may be placed into the corresponding placement openings 52 (not illustrated) and equipped with seed mats 56 (not illustrated). In other words, in this way, in each storey of the apparatus for growing plants, up to four different plant types may be grown from corresponding seeds 58 (not illustrated) applied onto the seed mats 56.

Each of the irrigation troughs 421, 431 may for example have a volume in a range from approximately 5 l to approximately 10 l, optionally from approximately 6 l to approximately 9 l, optionally from approximately 7 l to approximately 8 l. Furthermore, the first irrigation trough 421 may include, at its rear side, a first inlet 422, a first overflow notch 423 and a first outlet 424, and the second irrigation trough 431 may include, at its rear side, a second inlet 432, a second overflow notch (not illustrated) and a second outlet (not illustrated).

In the water circuit system 410, the water tank (not illustrated) may include an intake piece 413, wherein the intake piece 413 may be connected by means of a corresponding line 411*a* to the water circuit pump 414. The water circuit pump 414 may be configured to, by means of the intake piece 413, draw water in from the water tank through the line 411*a* and feed the water via the (distributor) valve 415 to the first individual circuit or water circuit 420 and/or to the second individual circuit or water circuit 430 and/or to further individual circuits or water circuits, for example to the third individual circuit or water circuit 440.

For example, the (distributor) valve 415 may be configured to, in the first individual circuit 420 (or water circuit 420), feed water to the first irrigation trough 421 via a further corresponding line 411*b* and via the first inlet 422. Analogously, the (distributor) valve 415 may be configured to, in the second individual circuit 430 (or the second water circuit 430), feed water to the second irrigation trough 431 via a further corresponding line 411*c* and via the second inlet 432.

The irrigation apparatus 20 may be configured to be actuated by means of the control device 60 such that water is fed via the first individual circuit 420 and via the second individual circuit 430 to the seed mats introduced into the accommodating space 12. For example, the control device 60 may be configured to actuate the (distributor) valve 415 in the water circuit system 410 of the irrigation apparatus 20 such that water is fed via the first individual circuit 420 and via the second individual circuit 430 to each of the irrigation troughs 421, 431 at regular intervals. It may thereby be ensured that the seeds or plants (not illustrated) introduced into the accommodating space 12 are supplied with water by means of the first irrigation trough 421 and the second irrigation trough 431. The method for feeding water to the irrigation troughs 421, 431 will be described in more detail with reference to FIG. 5B.

As described above, water is fed to the first irrigation trough 421 in the first individual circuit 420, and water is fed to the second irrigation trough 431 in the second individual circuit 430. Here, the first overflow notch 423 and the second overflow notch (not illustrated) are configured to ensure, during the filling of the respective first irrigation trough 421 and second irrigation trough 431 with water from the water circuit system 410, that excess water may run out of the first irrigation trough 421 and the second irrigation trough 431.

The first outlet 424 and the second outlet (not illustrated) may be configured such that the water located in the irrigation troughs 421, 431 may drain completely from the irrigation troughs 421, 431. The water tank (not illustrated) may be configured to collect the water that runs out of the irrigation troughs 421, 431 again. In other words, the water circuit system 410 is configured such that the water that runs out of the irrigation troughs 421, 431 remains in said water circuit system.

In various embodiments, the water circuit system 410 may furthermore include one or more filters (not illustrated), which are configured to collect root and leaf residues of plants growing in the accommodating space 12 and/or deposits of the nutrients. For example, a filter (not illustrated) of the water circuit system 410 may be arranged upstream of the intake piece 413 in the water tank (not illustrated).

In various embodiments, the irrigation apparatus 20 may furthermore include various sensors. For example, the water circuit system 410 of the irrigation apparatus 20 may include a first sensor 416 for determining the conductance of the water. As illustrated in FIG. 4, the first sensor 416 in the water circuit system 410 may for example be arranged between the water circuit pump 414 and the (distributor) valve 415. The first sensor 416 will be described in more detail with reference to FIG. 8.

Furthermore, the water circuit system 410 of the irrigation apparatus 20 may include a second sensor 417 for determining the water level in the water tank (not illustrated). As illustrated in FIG. 4, the second sensor 417 may for example be arranged on an outer side of a side wall of the water tank.

The second sensor 417 may for example be designed as a capacitive sensor for determining the filling level of the water in the water tank. Furthermore, the second sensor 417 may be configured to contactlessly determine the filling level of the water in the water tank.

Alternatively, the first sensor 416 for determining the conductance of the water and the second sensor 417 for determining the water level in the water tank (not illustrated) may be arranged together in one housing.

As a further alternative, the sensor for determining the conductance of the water may be configured to also determine the water level in the water tank (not illustrated). In other words, the first sensor 416 may be designed as a combined sensor 416 (hereinafter also referred to as sensor 416) for determining both the conductance of the water and for determining the water level in the water tank. For example, the sensor 416 may be configured to contactlessly determine the conductance of the water and the water level of the water. For example, the sensor 416 may be a capacitive sensor 416.

In various embodiments, the first sensor 416 (or the sensor 416) and/or the second sensor 417 may be configured to output measured values to the control unit 60, or in other words feed measured values to the control unit.

Correspondingly, in various embodiments, the control unit 60 may be configured to receive measured values of the first sensor 416 (or of the sensor 416) and/or measured values of the second sensor 417. Furthermore, the control unit 60 may for example be configured to generate and output a warning signal if the water level in the water tank falls below a certain value.

In various embodiments, the third individual circuit 440 of the water circuit system 410 may be provided for purifying the water. For this purpose, the water circuit system 410 may include an apparatus for purifying the water 441. The (distributor) valve 415 may correspondingly be configured to, in the third individual circuit 440, feed water to the apparatus for purifying the water 441 via further corresponding lines 411d.

The apparatus for purifying the water 441 may be configured to purify the water by irradiation of the water with light in a wavelength range in the UV-C range. The apparatus for purifying the water 441 may include a light source (not illustrated) for emitting light with a wavelength in the UV-C range. The light source (not illustrated) may be configured to emit light in a wavelength range of approximately 200 nm to approximately 280 nm. The apparatus for purifying the water 441 will be described in more detail with reference to FIG. 9A and FIG. 9B.

FIG. 5A shows a flow diagram of a method for growing plants according to various embodiments.

As illustrated in FIG. 5A, in various embodiments, the method for growing plants includes: introducing one or more seed mats into an accommodating space of an apparatus for growing plants, 510; actuating an irrigation apparatus by means of a program controller of a control unit, wherein the irrigation apparatus includes a water circuit system, 520; feeding water to the seed mats by means of the water circuit system, which includes at least one inlet, a water tank, at least one water circuit pump and at least one outlet, 530; and determining a conductance of the fed water by means of a sensor, 540.

In various embodiments, the method for growing plants may furthermore include determining a water level in the water tank of the irrigation apparatus. Here, the conductance of the water and the water level in the water tank may be determined by means of various sensors. Alternatively, the conductance of the water and the water level in the water tank may be determined by means of the same sensor. The conductance of the water and the water level in the water tank may furthermore for example be determined contactlessly. For example, the conductance of the water and the water level in the water tank may be determined capacitively.

The method may furthermore include feeding measured values of the sensors or of the sensor to the control unit. In other words, the method may furthermore include receiving measured values of the sensors or of the sensor by means of the control unit. Furthermore, the method may include generating and outputting a warning signal by means of the control unit if the water level in the water tank falls below a particular value.

In the method for growing plants, the feed of water to the seed mats may include feeding water by means of the irrigation apparatus from the water tank to one or more irrigation troughs of the irrigation apparatus, wherein the irrigation troughs are respectively arranged under the seed mats. For example, the irrigation apparatus may feed water to the irrigation troughs at regular intervals.

In the method, in various embodiments, it is furthermore possible for the irrigation apparatus to feed water and nutrients to the one or more irrigation troughs which, in each of the growing units, are arranged under the respective seed mats. In other words, in the method for growing plants, in each growing unit, water and nutrients may be fed to the seeds arranged on the seed mats, or to the plants growing from said seeds, by the irrigation apparatus via the irrigation troughs.

In various embodiments, the method for growing plants may furthermore include feeding mineral fertilizer and/or organic fertilizer and/or acid and/or base to the water in the water circuit system by means of at least one pump. Here, the pump may optionally be a peristaltic pump. For the feed of mineral fertilizer and/or organic fertilizer and/or acid and/or base to the water, the control unit may actuate the pumps such that they feed mineral fertilizer and/or organic fertilizer and/or acid and/or base to the water circuit system on the basis of the values determined for the conductance of the water. In other words, the control unit may regulate a nutrient content of the water on the basis of the conductance of the water.

In various embodiments, the method for growing plants may furthermore include introducing seeds onto the seed mats, wherein plants may grow from the seeds.

Furthermore, in various embodiments, the method may include accessing, from a data memory of the program controller, irrigation data adapted individually to the seeds and/or nutrient requirement data adapted individually to the seeds. For example, the irrigation data and/or nutrient requirement data adapted individually to the seeds may be accessed from a data memory of the program controller by means of the control unit. The control unit may subsequently, on the basis of the irrigation data and/or nutrient requirement data adapted individually to the seeds, actuate the irrigation apparatus such that the plants growing in the accommodating space are fed with a water quantity and/or nutrient quantity and/or nutrient composition beneficial to the growth of said plants.

Here, the data memory may be provided as an external data memory by means of an Internet connection provided in the apparatus for growing plants. In other words, the control unit may access corresponding data from an external data memory by means of an Internet connection, which is provided by means of corresponding antennae of the apparatus for growing plants. The external data memory may be part of a data cloud in which data and application programs may be stored in distributed and optionally redundant fashion.

In various embodiments, the method may furthermore include identifying at least one seed mat by means of a program sensor for the control of the program controller. For example, the control unit may detect RFID signals and/or a QR label and/or a barcode of the at least one seed mat by means of the program sensor for the control of the program controller. For this purpose, each of the seed mats may include an RFID label, such as for example an RFID tag (or in other words an RFID transponder; or in other words an RFID sticker) and/or a QR tag (or in other words a QR sticker; or in other words a QR label) and/or a barcode sticker (or in other words a barcode label). Correspondingly, the program sensor may be provided as an RFID sensor and/or QR code sensor and/or barcode sensor. In other words, the control unit may, by means of the RFID signals and/or the QR label and/or the barcode of the seed mats, identify the seeds arranged on the respective seed mat, access the irrigation data adapted to the respective seeds from the data memory, and adjust the water quantity fed to the corresponding irrigation trough to the respective seeds. Alternatively, the control unit may set intervals in which the irrigation troughs are filled, which intervals are adapted to the respective identified seeds. In other words, the control unit may adjust the intervals in which water is fed to the irrigation troughs to the respective identified seeds.

Likewise, the control unit may, by means of the RFID signals and/or the QR label and/or the barcode of the seed mats, identify the seeds arranged on the respective seed mat, access nutrient requirement data adapted to the respective seeds from the data memory, and adjust the nutrient quantity and/or nutrient composition fed to the corresponding irrigation trough to the respective seeds.

In this way, in the method for growing plants, in various embodiments, the water quantity and/or nutrient quantity and/or nutrient composition adapted to the seeds may be set by means of the control unit. For example, the control unit may feed the water quantity adapted to the respective seeds growing in the corresponding growing unit by means of the program controller on the basis of the accessed irrigation data. Alternatively, the control unit may adjust the intervals in which water is fed to the irrigation troughs to the respective identified seeds growing in a growing unit. Likewise, the control unit may feed the nutrient quantity and/or nutrient composition adapted to the respective seeds growing in the corresponding growing unit by means of the program controller on the basis of the accessed nutrient requirement data.

In other words, the control unit may, on the basis of the accessed irrigation data and/or nutrient requirement data, actuate the irrigation apparatus such that the water quantity fed to the corresponding irrigation trough, and/or the length of the intervals in which the corresponding irrigation troughs are filled, and/or nutrient quantity and/or nutrient composition, are adapted to the plants arranged in the respective growing unit (that is to say in a respective storey). For this purpose, the control unit may set a regulating variable for the nutrient content on the basis of the plants introduced into the accommodating space (for example in accordance with their type or their variety).

Furthermore, the method may include recording, by means of a camera, images of the seed mats accommodated in the accommodating space and of the plants growing from the seeds. In various embodiments, the method for growing plants may furthermore include transmitting signals from the camera to the program controller, comparing the images recorded by means of the camera with one or more reference images stored in a pattern recognition memory of the control unit in order to determine a state of the plants accommodated in the accommodating space by means of a pattern recognition apparatus of the control unit, and adapting the program controller to the respective plant and to the state of said plant.

In various embodiments, the control device may thus adjust the intervals in which the irrigation apparatus feeds the irrigation troughs with water to the respective seeds and/or to the state of the plants that have been introduced into the accommodating space. Likewise, the control device may adapt nutrient quantity and/or nutrient composition to the respective seeds and/or to the state of the plants that have been introduced into the accommodating space.

In various embodiments, the irrigation troughs may be filled with water in every interval. For example, the irrigation troughs may be filled with water via an inlet located on the irrigation trough in every interval. For example, the irrigation troughs may be completely filled with water once in every interval. Here, excess water may run off via an overflow notch located on each of the irrigation troughs. Furthermore, after the filling process, via an outlet located on each of the irrigation troughs, the water may drain from the irrigation trough again and flow back into the water tank. The feed of water to the seed mats will be described in more detail with reference to FIG. 5B.

In various embodiments, the irrigation apparatus may, in the method for growing plants, feed the water to one or more individual circuits (or in other words water circuits) of the water circuit system by means of a four-way valve. Here, the control unit may actuate the irrigation apparatus such that the water is fed to an individual circuit or a water circuit for each irrigation trough.

The method for growing plants may furthermore include determining a water temperature by means of a temperature sensor, wherein the temperature sensor is optionally an NTC thermistor.

Furthermore, the method may include filtering of the water in the water circuit system such that plant residues and/or nutrient deposits in the water circuit system are collected.

In various further embodiments, the method may furthermore include purifying the water by means of an apparatus in the irrigation apparatus. Here, the apparatus for purifying the water may purify the water by irradiation with light in the UV-C range. The control unit may for example actuate the irrigation apparatus such that the water is fed to an individual circuit for each irrigation trough and/or to an individual circuit (or in other words a water circuit) for purifying the water. An apparatus for purifying the water will be described in more detail with reference to FIG. 9A and FIG. 9B. A method for purifying the water will be described in more detail with reference to FIG. 10.

FIG. 5B shows a flow diagram of the feed of water to and of the discharge of water from the irrigation troughs by means of the irrigation apparatus of a method for growing plants according to various embodiments.

As illustrated in FIG. 5B, in various embodiments, the at least one irrigation trough is completely filled with water, 560. Subsequently, in various embodiments, the water may completely drain from the at least one irrigation trough, 570, before, in various embodiments, the at least one irrigation trough is completely refilled after a preset time interval has elapsed, 580.

For example, in various embodiments, in the method for growing plants, water is fed to the irrigation troughs by means of the irrigation apparatus. For example, as described above, water is fed to the irrigation troughs at regular intervals. Referring to FIG. 5B and FIG. 4, the control unit 60 (not illustrated) may for example actuate the water circuit system 410 such that water is fed from the water tank (not illustrated) to the first irrigation trough 421 through the first individual circuit 420 by means of the water circuit pump 414. Likewise, the control unit 60 may for example actuate the water circuit system 410 such that water is fed from the water tank to the second irrigation trough 431 through the second individual circuit 430 by means of the water circuit pump 414.

For example, the control unit may actuate the irrigation apparatus such that, at a first point in time, water is fed to a first irrigation trough 421 and, at a second point in time, water is fed to a second irrigation trough 431. Here, the first point in time may differ from the second point in time. Alternatively, the two irrigation troughs 421, 431 may be filled simultaneously.

Furthermore, the control unit 60 may for example actuate the water circuit pump 414 such that the respective irrigation trough 421, 431 is completely filled. This may be achieved by virtue of the water circuit pump 414 pumping an excess of water to the respective irrigation trough 421, 431. Excess water may run out in a controlled manner via the overflow notch (see for example the first overflow notch 423 on the first irrigation trough 421 of FIG. 4) located on each of the irrigation troughs. For this purpose, the respective overflow notch may be arranged on a rear side of the respective irrigation trough 421, 431 such that the excess water may flow on an inner rear side wall (not illustrated) of the apparatus for growing plants back to the water tank.

Here, during the complete filling of the irrigation troughs 422, 432, the roots of the plants (not illustrated) which are arranged above at least one of the irrigation troughs 421, 431 and which grow from the seeds (not illustrated) applied onto the seed mats (not illustrated) may be immersed in the water such that they are fully wetted.

More specifically, in various embodiments, the control unit 60 may actuate the water circuit pump 414 such that the respective irrigation trough 421, 431 is filled to different levels in a manner dependent on a state of the seeds located on the seed mats or on a state of the plants growing on the seed mats. For example, in the event that the seeds on the seed mats have not yet developed any roots, the control unit 60 may cause the respective irrigation trough 421, 431 to be filled to such an extent that a water level wets the seed mat such that the seeds on the seed mats may swell further and for example form roots. On the other hand, in the event that the seeds on the seed mats have already developed roots, the control unit 60 may cause the respective irrigation trough 421, 431 to be filled to such an extent that a water level reaches the roots of the plants but the water level does not wet the seed mats, such that, in this state of the plants, the seed mats remain as dry as possible, such that mold formation in the seed mats can be prevented.

After the complete filling of the irrigation troughs 421, 431, the water present in the irrigation troughs 421, 431 may drain from the irrigation troughs 421, 431 via the first outlet 424 and via the second outlet (not illustrated) respectively (570). Here, the first outlet 424 and the second outlet are likewise arranged on the rear side of the respective irrigation trough 421, 431, such that the water may drain completely along the inner rear side wall of the apparatus for growing plants.

By means of the complete filling of the irrigation troughs 421, 431 (560), the subsequent complete drainage of the water from the irrigation troughs 421, 431 (570) and the intervals between the draining of the water and the subsequent refilling (580), it may be ensured that the roots of the plants are fully wetted during every filling process, but that the roots do not project into the water in the interval between two filling processes, such that sufficient oxygen can reach the roots. The water that runs out of the irrigation troughs 421, 431 may be collected in the water tank again. In other words, the water running out of the irrigation troughs 421, 431 remains in the water circuit system 410.

Here, the control unit 60 (see FIG. 1) may actuate the irrigation apparatus 20 such that water is fed to the irrigation troughs 421, 431 in preset intervals. A length of time between two complete filling operations of the irrigation troughs 421, 431 (560, 580) may lie for example in a range from approximately 10 min to approximately 60 min, optionally from approximately 15 min to approximately 50 min, optionally from approximately 20 min to approximately 40 min. In other words, an interval may have a time duration (or may be a period of time) for example in a range from approximately 10 min to approximately 60 min, optionally from approximately 15 min to approximately 50 min, optionally from approximately 20 min to approximately 40 min.

The control unit 60 may control the irrigation unit 20 such that the intervals between the filling operations of the irrigation troughs 421, 431 are adapted to the seeds applied onto the seed mats and/or to the growth progress of the plants growing on the seed mats. For example, the control unit may adapt the time duration (or period of time) between two filling operations of the irrigation troughs 421, 431 to the respective seeds and/or to the state of the plants that have been introduced into the accommodating space 12. For this purpose, as already described above, the method may include recording images of the seed mats accommodated in the accommodating space, and of the plants growing from the seeds, by means of a camera. In various embodiments, the feed of water to the seed mats may furthermore include transmitting signals from the camera to the program controller, comparing the images recorded by means of the camera with one or more reference images stored in a pattern recognition memory of the control unit in order to determine a state of the plants accommodated in the accommodating space by means of a pattern recognition apparatus of the control unit, and adapting the program controller to the respective plant and to the state of said plant.

FIG. 6 shows a detail of the water circuit system having an apparatus for feeding nutrients according to various embodiments.

In FIG. 6, for the sake of simplicity, not all of the elements of the water circuit system 610 are illustrated. Aside from lines 611, a water circuit pump 614, a (distributor) valve 615 and a sensor 616, the water circuit system 610 has further elements as have already been described with reference to FIG. 3 and FIG. 4. Furthermore, the water circuit system 610 of the irrigation apparatus 20 includes, as illustrated in FIG. 6, an apparatus for feeding nutrients 650.

As illustrated in FIG. 6, the water circuit system 610 includes the apparatus for feeding nutrients 650. The apparatus for feeding nutrients 650 may be configured to feed nutrients and/or salts to the water that is fed to the irrigation troughs (not illustrated). For example, the apparatus for feeding nutrients 650 may be configured to feed mineral and/or organic nutrients, such as for example mineral and/or organic fertilizer, and/or acids and/or bases, to the water.

As is also illustrated in FIG. 6, for this purpose, the water circuit system 610 according to various embodiments may include one or more pumps 651, 652, which may be designed as peristaltic pumps 651, 652. Here, each of the pumps 651, 652 may be coupled to a respective storage container 661, 662 such that the respective pump 651, 652 may add a liquid stored in the corresponding storage container 661, 662 to the water circulated by pumping in the water circuit system 610.

For example, a first pump 651 may be connected to a first storage container 661, in which a nutrient solution, e.g. a mineral and/or organic fertilizer, may be stored. For example, the first pump 651 may be connected to the first storage container 661 in which the mineral fertilizer may be stored, or the first pump 651 may be connected to the first storage container 661 in which the organic fertilizer may be stored. Alternatively, the apparatus for feeding nutrients 650 may include two pumps 651, 652 and two storage containers 661, 662, wherein, for example, the storage container 661 stores mineral fertilizer and the storage container 662 stores organic fertilizer.

Furthermore, the second pump 652 may be connected to the second storage container 662, wherein an acid and/or base may be stored in the second storage container 662. Alternatively, the second pump 652, which is coupled to the second storage container 662, and a third pump (not illustrated), which is connected to a third storage container (not illustrated), may have, wherein an acid may be stored in the second storage container 662 and a base may be stored in the third storage container. As a further alternative, the first pump 651 may be connected to the first storage container 661 in which the mineral fertilizer may be stored, the second pump 652 may be connected to the second storage container 662 in which the organic fertilizer may be stored, the third pump may be connected to the third storage container in which the acid may be stored, and a fourth pump may be connected to a fourth storage container in which the base may be stored.

The control unit 60 (see FIG. 1) may be configured to control the pumps 651, 652 of the apparatus for feeding nutrients 650 such that nutrients are fed from the storage containers 661, 662 to the water in the water circuit system 610. Here, the storage containers 661, 662 may, as described above, include mineral fertilizer and/or organic fertilizer and/or acid and/or base as nutrients. For this purpose, the storage containers 661, 662 may be connected to the water circuit system 610 such that the nutrients stored in the storage containers 661, 662 are fed by means of the control unit to the water present in the water circuit system 610. As illustrated in FIG. 3, the storage containers may for example be connected to the water tank. Alternatively, as illustrated in FIG. 6, the storage containers 661, 662 may be connected to the water circuit pump 614 and/or to portions of lines 611 of the water circuit system 610.

For example, the control unit 60 may be correspondingly configured to control the pumps 651, 652, for example the first pump 651 and the second pump 652, such that certain quantities of mineral and/or organic fertilizer and/or acid and/or base are added from the respective storage containers 661, 662, for example from the first storage container 661 and the second storage container 662, to the water in the first water circuit 420 (see FIG. 4) and in the second water circuit 430.

In various embodiments, the control unit 60 (not illustrated) may furthermore be configured to receive measured values from the sensor 616. For example, the control unit 60 may receive data from the sensor 616 for determining a conductance of the water. Furthermore, the control unit may be configured to regulate a nutrient content of the water on the basis of the conductance of the water. In other words, the control unit 60 may be configured to regulate the nutrient content of the water on the basis of the measured values received from the sensor 616. For example, the control unit 60 may be configured to actuate the pumps 651, 652 on the basis of the measured values determined for the conductance of the water such that said pumps dispense mineral fertilizer and/or organic fertilizer and/or acid and/or base from the respective storage containers 561, 562 into the water circuit system 610.

The control unit 60 may additionally be configured to set a regulating variable for the nutrient content on the basis of the plants introduced into the accommodating space 12 and/or of the state of said plants. For this purpose, the apparatus for growing plants (see FIG. 1), which includes the irrigation apparatus 20 with the apparatus for feeding nutrients 650, may furthermore include a camera (not illustrated) for recording images of the seed mats (not illustrated) accommodated in the accommodating space and of the plants (not illustrated) growing from the seeds.

Furthermore, the control unit may include a pattern recognition apparatus (not illustrated) and an associated pattern recognition memory (not illustrated) and be configured to transmit signals from the camera to the program controller (not illustrated). Furthermore, the control unit 60 may be configured to, by means of the pattern recognition apparatus, compare the images recorded by means of the camera with one or more reference images stored in the pattern recognition memory in order to determine a state of the plants accommodated in the accommodating space in order to thus adjust the program controller to the respective plant and to the state of said plant. In other words, the control unit may be configured to actuate the apparatus for feeding nutrients such that a composition of the water fed to the irrigation troughs is adapted to the respective seeds and/or to the state of the plants growing from the seeds.

In further embodiments, the irrigation apparatus may furthermore provide a possibility, for example, of feeding different plant varieties which are growing simultaneously in different growing units in the accommodating space with water of different composition for the purposes of optimum growth, for example via the additional line 312. On the other hand, in the apparatus for growing plants, there may also be provided a second irrigation apparatus which is equipped similarly to the irrigation apparatus described here, wherein, by means of the two irrigation apparatuses, different plant varieties which are germinating and/or growing simultaneously in different growing units in the accommodating space are fed with water of different composition for the purposes of optimum growth.

Likewise, by means of the present irrigation apparatus, a possibility may be provided of feeding water of different composition to the individual irrigation troughs for example over the course of the plant growth from the germination of the seeds to the bearing and ripening of any fruits. For example, a possibility may be provided, by means of the present irrigation apparatus, of feeding certain plants at a certain point of growth with mineral fertilizer of a more acidic composition, whereas, at another point in time, an organic fertilizer of a basic composition may be fed.

FIG. 7 is an overview illustration of the irrigation apparatus with the apparatus for feeding nutrients according to various embodiments. In the overview illustration of the irrigation apparatus, the arrangement of the individual elements of the water circuit system in the apparatus for growing plants is illustrated.

As illustrated in FIG. 7, in various embodiments, the water circuit system 710 includes lines 711, a water circuit pump 714, a sensor 716, a (distributor) valve 715, a first individual circuit 720, a second individual circuit 730, a third individual circuit 740 and an apparatus for feeding nutrients 750. Here, the first individual circuit 720 (or in other words the first water circuit 720) may include a first irrigation trough 721, the second individual circuit 730 (or in other words the second water circuit 730) may include a second irrigation trough 731, and the third individual circuit 740 (or in other words the third water circuit 740) may include an apparatus for purifying water 741.

Furthermore, the apparatus for feeding nutrients 750 may include a first pump 751, a second pump 752, a first storage container 761 and a second storage container 762.

As has been described with reference to FIG. 4, the water circuit system 710 may furthermore include at least one filter (not illustrated) which is configured to collect plant residues and/or nutrient deposits in the water circuit system. For example, a filter of the water circuit system 710 may be arranged upstream of an intake piece (not illustrated) of the water circuit pump 714 in the water tank (not illustrated), and further filters (not illustrated) may be respectively arranged in the lines 711 between the storage containers 761, 762 and the corresponding pumps 751, 752.

The water circuit system 710 may be configured to feed water to the seed mats (not illustrated) arranged on the irrigation troughs 721, 731 as described in detail above with reference to FIG. 3, FIG. 4 and FIG. 6. Likewise, the method for growing plants may be carried out by means of the water circuit system 710 as described in detail with reference to FIG. 5A and FIG. 5B. Therefore, here, a detailed description of the apparatus for growing plants, which includes an irrigation apparatus with the water circuit system 710, and a detailed description of the method for growing plants by means of the water circuit system 710, will be omitted.

FIG. 8 is a schematic illustration of a sensor for determining a conductance of the water in the water circuit system according to various embodiments.

As illustrated in FIG. 8, according to various embodiments, the sensor 816 for determining the conductance of the water in the water circuit system may include at least one composed of a voltage generator 820, a circuit 830, a sensor circuit 850, an amplifier circuit 860 and a rectifier 870.

The voltage generator 820 may for example include a negative voltage generator or DC-DC voltage converter, e.g. a charge pump voltage inverter with variable switching frequency. The voltage generator 820 may for example include a DC voltage supply and be provided for being able to supply the circuit 830 with a negative DC voltage.

In various embodiments, the circuit 830 may include a circuit for generating an AC voltage, for example a sine wave generator circuit, or a diode-stabilized Wien-Robinson oscillator circuit. The circuit 830 may furthermore include, for example, an amplifier.

In various embodiments, the sensor 816 may include the sensor circuit 850. The sensor circuit 850 may for example include an amplifier, for example a non-inverting amplifier or a subtractor or a differential amplifier.

The amplifier circuit 860 of the sensor 816 may for example include a non-inverting amplifier circuit or a voltage follower or a buffer amplifier. The rectifier 870 may for example include an AC to DC voltage converter, for example a peak value rectifier.

The sensor 816 may furthermore include a temperature measuring circuit (not illustrated), for example a negative temperature coefficient circuit (NTC circuit), e.g. an NTC resistor or NTC thermistor or thermistor. The sensor 816 may thus be configured to perform compensation of the influence of the temperature on a measured signal of the sensor circuit 850 using a measured signal of the temperature measuring circuit. In other words, the sensor 816 may be configured to perform temperature compensation of the measured signal of the sensor circuit 850 on the basis of the measured signal of the temperature measuring circuit. In other words again, in various embodiments, by means of the temperature measuring circuit, an output signal of the sensor 816 may be temperature-compensated through the possibility of temperature influences being subtracted from the output signal of the sensor 816 by calculation.

In various embodiments, the sensor 816 may be embodied for example as a conductive conductance sensor and may furthermore be configured to also determine a change in resistance between two electrodes in a container in order to determine a filling level of a medium present in the container, for example of a liquid or a liquid mixture, in a container.

Alternatively, in various embodiments, the sensor 816 may be embodied for example as a capacitive conductance sensor and may be configured to determine a change in capacitance brought about by a change in the filling level of a liquid. The sensor 816 may furthermore be embodied as a combined capacitive sensor and may be configured to determine both the conductance of the liquid and a change in capacitance brought about by a change in the filling level of the liquid. For example, a rod-shaped conductance sensor, which may be installed for example perpendicular to the liquid surface, may be configured to determine both the conductance of the liquid and the filling level of the liquid.

As a further alternative, the sensor circuit may be configured to contactlessly determine the conductance of the liquid and the filling level of the liquid in the container.

Figure 9A:
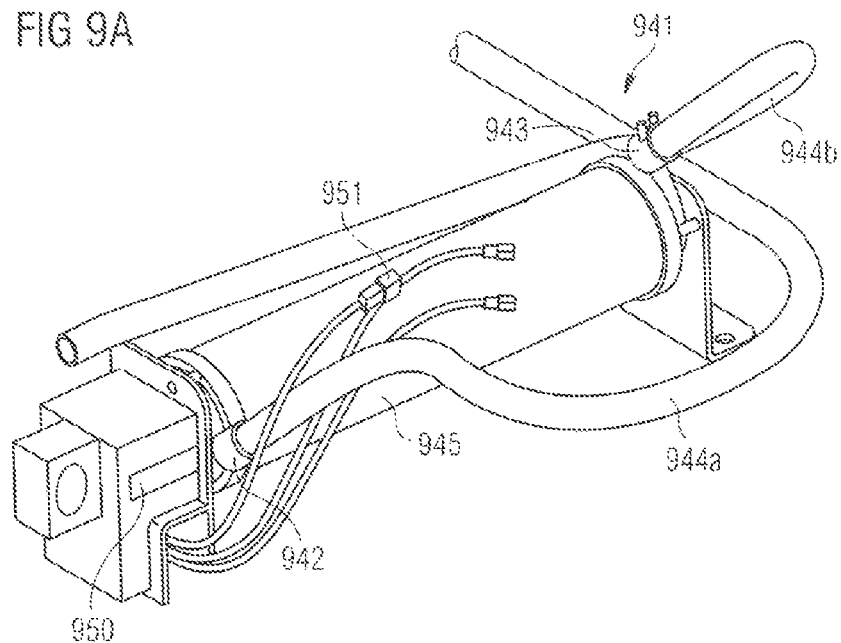
FIG. 9A shows an illustration of an apparatus for purifying the water of the irrigation apparatus according to various embodiments.
Figure 9B:
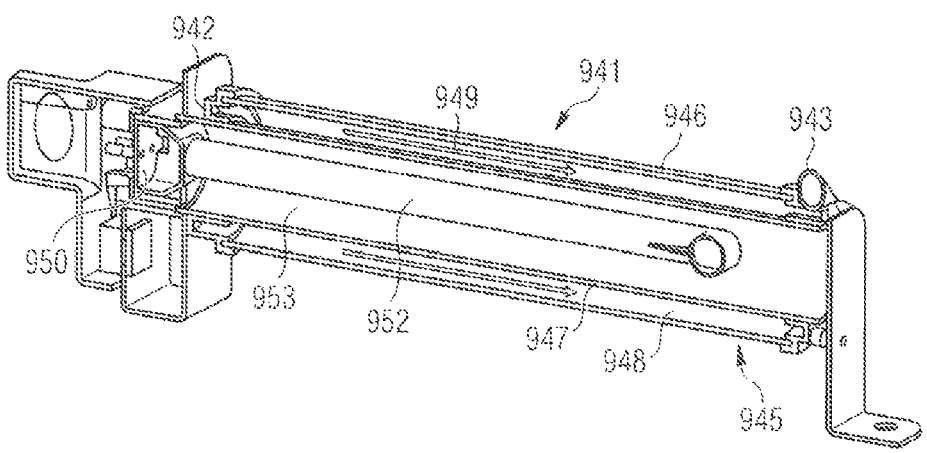
FIG. 9B shows a cross-sectional view of the apparatus for purifying the water of the irrigation apparatus according to various embodiments.

FIG. 9A is an illustration of an apparatus for purifying the water of the irrigation apparatus according to various embodiments. FIG. 9B shows a cross-sectional view of the apparatus for purifying the water of the irrigation apparatus according to various embodiments.

As illustrated in FIG. 9A, the apparatus for purifying the water 941 of the irrigation apparatus of the apparatus for growing plants may include a purification pipe 945, a feed connector 942, an outflow connector 943 and an illuminant socket 950. The illuminant socket 950 may include connecting wires 951 for connecting the illuminant socket to an electrical supply (not illustrated). The feed connector 942 and the outflow connector 943 may be configured to be connected to hoses 944 and/or pipes 944 of the irrigation apparatus of the apparatus for growing plants, as already described with reference to FIG. 4 and FIG. 7. The irrigation apparatus of the apparatus for growing plants may be configured to feed water to the purification pipe 945 of the apparatus for purifying the water 941 via the individual circuit 440 and 740 as described with reference to FIG. 4 and FIG. 7, respectively. For example, the irrigation apparatus may be configured to feed water from the water circuit system to the purification pipe 945 via a hose 944*a* and the feed connector 942, and to discharge the water from the purification pipe 945 again via the outflow connector 943 and a hose 944*b* and to conduct said water back to the irrigation apparatus.

As illustrated in the cross-sectional view of the apparatus for purifying the water 941 of FIG. 9B, the purification pipe 945 may include an outer pipe 946 and an inner pipe 947, which are arranged concentrically. In other words, the purification pipe 945 is composed of the outer pipe 946 and the inner pipe 947. The outer pipe 946 and the inner pipe 947 may be arranged such that an intermediate space 948 is formed in the purification pipe 945. Here, an intermediate space 948 between the outer pipe 946 and the inner pipe 947 is configured to conduct water through between the outer pipe 946 and the inner pipe 947 (arrows 949). Here, the apparatus for purifying the water 941 is configured to feed the water to the intermediate space 948 via the hose 944*a* and the feed connector 942 and to conduct the water via the outflow connector 943 and the hose 944*b* back to the irrigation apparatus.

The inner pipe 947 of the purification pipe 945 may furthermore be configured to accommodate an illuminant 952 which is connected to the illuminant socket 950, wherein the illuminant socket 950 may be connected to the purification pipe 945. Here, the illuminant socket 950 may be connected to the purification pipe 945 such that the illuminant 952 is arranged concentrically with the outer pipe 946 and the inner pipe 947 in the inner pipe 947. The illuminant socket may be configured to feed electrical current from the electrical supply (not illustrated) to the illuminant 952 via the connecting wires 951.

The outer pipe 946 may be formed from a UV-resistant material, such as for example glass, metal or plastic, or some other suitable material. The outer pipe 946 may furthermore include a protective layer (not illustrated), for example an outer coating (not illustrated). The outer coating may be formed from, for example, UV-stable lacquer or UV-stable foil.

The outer pipe 946 may have a diameter in a range from approximately 40 mm to approximately 50 mm, for example in a range from approximately 42 mm to approximately 48 mm, for example in a range from approximately 44 mm to approximately 46 mm. The outer pipe 946 may furthermore have a length in a range from approximately 170 mm to approximately 250 mm, for example in a range from approximately 190 mm to approximately 220 mm, for example in a range from approximately 200 mm to approximately 210 mm.

The inner pipe 947 may be formed from a UV-permeable material, such as for example UV-permeable glass or UV-permeable plastic, or some other suitable material. For example, the inner pipe 947 may be formed from UV-permeable quartz glass.

The inner pipe 947 may have a diameter in a range from approximately 25 mm to approximately 40 mm, for example in a range from approximately 30 mm to approximately 35 mm, for example in a range from approximately 32 mm to approximately 33 mm. The inner pipe 947 may furthermore have a length in a range from approximately 170 mm to approximately 250 mm, for example in a range from approximately 190 mm to approximately 220 mm, for example in a range from approximately 200 mm to approximately 210 mm. The inner pipe 947 may have the same length as the outer pipe 946.

The intermediate space 948 between the outer pipe 946 and the inner pipe 947 may thus have a width in a range from approximately 1 mm to approximately 15 mm, for example in a range from approximately 3 mm to approximately 8 mm, for example in a range from approximately 5 mm to approximately 7 mm. As a result, the intermediate space 948 has a throughflow volume in a range from approximately 0.1 l to approximately 0.2 l, for example in a range from approximately 0.13 l to approximately 0.16 l, for example in a range from approximately 0.14 l to approximately 0.15 l. The purification pipe 945 may be configured such that water in the corresponding individual circuit (for example individual circuit 440 in FIG. 4 and individual circuit 740 in FIG. 7) of the water circuit system (not illustrated) of the irrigation apparatus (not illustrated) is pumped through the intermediate space 948 between the outer pipe 946 and the inner pipe 947 (see arrows 949).

The illuminant 952 may be configured to be arranged within the inner pipe 947. For this purpose, the illuminant 952 may have an outer diameter and a length which lie in a range such that the illuminant 952 may for example be pushed into the inner pipe 947. Here, the illuminant 952 may have a shorter length than the outer pipe 946 and the inner pipe 947.

Here, the illuminant 952 may be arranged in the inner pipe 947 such that a gap 953 remains between the inner wall of the inner pipe 947 and the illuminant 952. Here, the gap 953 may have an average width in a range from approximately 0.3 mm to approximately 5 mm, for example in a range from approximately 0.4 mm to approximately 2.5 mm, for example in a range from approximately 0.5 mm to approximately 1 mm.

The illuminant 952 may be a UV lamp 952. In other words, the illuminant 952 may be configured to emit light in a UV wavelength range of the spectrum. The illuminant 952 may in particular be configured to emit light in a UV-C wavelength range. For example, the illuminant 952 may be configured to emit light in a wavelength range from approximately 200 nm to approximately 280 nm, for example in a range from approximately 230 nm to approximately 260 nm, for example in a range from approximately 250 nm to approximately 255 nm.

The illuminant 952 may exhibit power in a range from approximately 5 W to approximately 20 W, for example in a range from approximately 7 W to approximately 15 W, for example in a range from approximately 10 W to approximately 11 W. Here, the illuminant 952 may exhibit radiation power in the UV wavelength range in a range from approximately 2 W to approximately 5 W, for example in a range from approximately 2.5 W to approximately 4 W, for example in a range from approximately 2.8 W to approximately 3.6 W.

Thus, the illuminant 952 may exhibit an irradiance in the UV-C range, determined at a distance of approximately 1 m, in a range from approximately 0.2 W/m$^2$ to approximately 0.4 W/m$^2$, for example in a range from approximately 0.25 W/m$^2$ to approximately 0.37 W/m$^2$, for example in a range from approximately 0.3 W/m$^2$ to approximately 0.35 W/m$^2$. As illuminant 952, use may for example be made of a lamp of the type "Puritec UV-C" (HNS S/E 11W 2G7) from OSRAM. However, the illuminant 952 is not restricted to this, but rather any other illuminant which has the required irradiance in the UV range may likewise be used.

The control unit (not illustrated) of the apparatus for growing plants may be configured to actuate the irrigation apparatus (not illustrated) such that the water present in the water circuit system of the irrigation apparatus is pumped through the intermediate space 948 of the purification pipe 945 (see arrows 949). Here, the control unit may be configured to actuate the apparatus for purifying the water 941 such that the illuminant 952 arranged in the purification pipe 945 emits light in the UV-C range such that the water present in or flowing through the intermediate space 948 is purified. For example, the control unit may be configured to actuate the irrigation apparatus and the apparatus for purifying the water 941 such that fungi, protists, bacteria and/or algae present in the water are killed.

For this purpose, the control unit may be configured to pump (see arrows 949) the water that is present in the irrigation apparatus through the purification pipe with a throughflow rate such that the duration (or time period) of illumination by means of the illuminant 952 is sufficient for killing fungi, protists, bacteria and/or algae. In other words, the control unit may be configured to actuate the irrigation apparatus and the apparatus for purifying the water 941 such that the water of the water circuit system remains in the intermediate space 948 for so long, or in other words for such a length of time, that fungi, protists, bacteria and/or algae present in the water are killed. In other words, the control unit may be configured to actuate the irrigation apparatus and the apparatus for purifying the water 941 such that the throughflow rate of the water through the intermediate space 948 is set, or in other words such that the water remains in the intermediate space 948 for such a time period, that fungi, protists, bacteria and/or algae present in the water are killed by means of the UV-C light emitted by the illuminant 952. For example, the control unit may be configured to set a time period for which the water located in or flowing through the intermediate space 948 is irradiated by means of the illuminant 952. On the other hand, the control unit may be configured to regulate or control, or in other words vary, the duration (or time period) for which the water located in or flowing through the intermediate space 948 is irradiated by means of the illuminant 952. Here, the control unit may on the one hand be configured to pump the water of the water circuit system continuously through the purification pipe 945. In other words, the control unit may be configured to actuate the irrigation apparatus such that water is pumped continuously through the intermediate space 948 of the purification pipe 945. On the other hand, the control unit may on the one hand be configured to pump the water of the water circuit system at intervals through the purification pipe 945. In other words, the control unit may be configured to actuate the irrigation apparatus such that water is pumped at intervals through the intermediate space 948 of the purification pipe 945.

For example, the control unit may be configured to actuate the irrigation apparatus such that the water is fed at regular intervals to the apparatus for purifying the water 941. However, the control unit may also be configured to actuate the irrigation apparatus such that the water is fed in preset cycles to the apparatus for purifying the water 941. For example, the control unit may be configured to actuate the irrigation apparatus such that the water of the water circuit system is fed in cycles which are such that fungi, protists, bacteria and/or algae present in said water are killed. A more detailed description of the actuation of the irrigation apparatus and of the apparatus for purifying the water 941 by means of the control unit for purifying the water will be described in more detail with reference to FIG. 10.

It is to be noted that, in various embodiments, the apparatus described here for purifying the water 941 may be provided in the irrigation apparatuses of the apparatus for growing plants which are presented with reference to all of the figures discussed and described above. For example, the apparatus described here for purifying the water 941 may be provided in the water circuit system 310 of FIG. 3 even though it is not explicitly illustrated in FIG. 3. Likewise, the apparatus for purifying the water 441 described in conjunction with the description of the water circuit system 410 with reference to FIG. 4 may be provided by means of the apparatus for purifying the water 941 described here. This applies analogously to the apparatus for purifying the water 741 of the water circuit system 710 illustrated in FIG. 7.

FIG. 10 shows a flow diagram of a method for growing plants according to various embodiments.

As illustrated in FIG. 10, in various embodiments, a method for growing plants includes introducing one or more seed mats into an accommodating space of an apparatus for growing plants, 1010, controlling an irrigation apparatus by means of a program controller of a control unit, wherein the irrigation unit includes a water circuit system and water, 1020, and purifying the water in the irrigation apparatus, 1030.

In various embodiments, the method for growing plants may be provided by means of an apparatus for growing plants as described with reference to FIG. 1 of this description. Likewise, the method for growing plants may be provided by means of an apparatus for growing plants as described with reference to other figures of this description. For example, the method for growing plants may be provided by means of the apparatus for growing plants which includes an irrigation apparatus as described with reference to FIG. 3, FIG. 4, FIG. 6, and/or FIG. 7. For example, the purification of the water may be provided by means of an apparatus for purifying the water, which apparatus is integrated into the irrigation apparatus. For example, the purification of the water may be realized by means of the apparatus for purifying the water 941 as described with reference to FIG. 9. Likewise, the purification of the water may be provided by means of the apparatus for purifying the water 441 of the water circuit system 410 as described with reference to FIG. 4, and the purification of the water may be provided by means of the apparatus for purifying the water 741 of the water circuit system 710 as described with reference to FIG. 7.

In various embodiments, the water in the irrigation apparatus may be purified by irradiation of the water by means of the apparatus for purifying the water 941. For example, the irradiation of the water with light in the UV-C range may be provided by means of the illuminant 952, which may emit light in the UV-C range. In other words, the illuminant 952 may emit light in the UV wavelength range of the spectrum. In various embodiments, the illuminant 952 may emit light in the UV-C wavelength range of the spectrum. For example, the illuminant 952 may emit light in a wavelength range from approximately 200 nm to approximately 280 nm, for example in a range from approximately 230 nm to approximately 260 nm, for example in a range from approximately 250 nm to approximately 255 nm.

Here, the illuminant 952 may emit light with a power in a range from approximately 5 W to approximately 20 W, for example in a range from approximately 7 W to approximately 15 W, for example in a range from approximately 10 W to approximately 11 W. Here, a radiation power in the UV wavelength range of the illuminant 952 may lie in a range from approximately 2 W to approximately 5 W, for example in a range from approximately 2.5 W to approximately 4 W, for example in a range from approximately 2.8 W to approximately 3.6 W.

Thus, an irradiance in the UV-C range of the illuminant 952, determined at a distance of approximately 1 m, may lie in a range from approximately 0.2 $W/m^2$ to approximately 0.4 $W/m^2$, for example in a range from approximately 0.25 $W/m^2$ to approximately 0.37 $W/m^2$, for example in a range from approximately 0.3 $W/m^2$ to approximately 0.35 $W/m^2$. As illuminant 952, use may for example be made of a lamp of the type "Puritec UV-C" (HNS S/E 11W 2G7) from OSRAM. However, the illuminant 952 is not restricted to this, but rather any other illuminant which has the required irradiance in the UV range may likewise be used.

Accordingly, by means of the illuminant 952 in the above-described arrangement, it is possible to achieve an illumination intensity in the UV wavelength range in a range from approximately 145 $W/m^2$ to approximately 155 $W/m^2$, for example in a range from approximately 150 $W/m^2$ to approximately 152 $W/m^2$, for example in a range from approximately 151.5 $W/m^2$ to approximately 151.8 $W/m^2$, with which the water present in the gap 953 between the outer pipe 946 and the inner pipe 947 is irradiated.

Referring to FIG. 9A and FIG. 9B, the control unit of the apparatus for growing plants may actuate the irrigation apparatus such that the water located in the water circuit system of the irrigation apparatus is pumped through an intermediate space 948 of the purification pipe 945 (see arrows 949). Here, the control unit may actuate the apparatus for purifying the water 941 such that the illuminant 952 arranged in the purification pipe 945 emits light in the UV-C range such that the water located in the intermediate space 948 is purified. For example, the control unit may actuate the irrigation apparatus and the apparatus for purifying the water 941 such that fungi, protists, bacteria and/or algae present in the water are killed.

For this purpose, the control unit may pump the water present in the irrigation apparatus through the purification pipe (see arrows 949) with a throughflow rate such that the duration (or period of time) of illumination by means of the illuminant 952 is sufficient for killing fungi, protists, bacteria and/or algae. In other words, the control unit may actuate the irrigation apparatus and the apparatus for purifying the water 941 such that the water of the water circuit system remains in the intermediate space 948 for so long, or in other words for such a length of time, that fungi, protists, bacteria and/or algae present in the water are killed. In other words, the control unit may actuate the irrigation apparatus and the apparatus for purifying the water 941 such that the throughflow rate of the water through the intermediate space 948 is set, or in other words such that the water remains in the intermediate space 948 for such a time period, that fungi, protists, bacteria and/or algae present in the water are killed by means of the UV-C light emitted by the illuminant 952. For example, the control unit may set a duration (or time period) for which the water located in the intermediate space 948 is irradiated by means of the illuminant 952. On the other hand, the control unit may regulate or control, or in other words vary, the duration (or period of time) for which the water located in the intermediate space 948 is irradiated by means of the illuminant 952.

For example, to kill germs that are present, irradiation with UV-C light in a range from approximately 2000 Ws/m$^2$ to approximately 5000 Ws/m$^2$, for example in a range from approximately 2500 Ws/m$^2$ to approximately 4000 Ws/m$^2$, for example in a range from approximately 3000 Ws/m$^2$ to approximately 3500 Ws/m$^2$ is required. Thus, the irradiation achieved by means of the above-described illuminant 952 with the corresponding irradiance in the UV wavelength range yields a required time of exposure of the water in the purification pipe 945, in order to kill the cells that are present, in a range from approximately 10 s to approximately 30 s, for example in a range from approximately 15 s to approximately 25 s, for example in a range from approximately 19 s to approximately 21 s.

Here, the control unit may on the one hand pump the water of the water circuit system continuously through the purification pipe 945. In other words, the control unit may actuate the irrigation apparatus such that water is pumped continuously through the intermediate space 948 of the purification pipe 945. On the other hand, the control unit may pump the water of the water circuit system at intervals through the purification pipe 945. In other words, the control unit may actuate the irrigation apparatus such that water is pumped in cycles through the intermediate space 948 of the purification pipe 945.

For example, the control unit may actuate the irrigation apparatus such that the water is fed at regular intervals to the apparatus for purifying the water 941. However, the control unit may also actuate the irrigation apparatus such that the water is fed in preset cycles to the apparatus for purifying the water 941. For example, the control unit may actuate the irrigation apparatus such that the water of the water circuit system is fed to the apparatus for purifying the water in cycles which are such that fungi, protists, bacteria and/or algae present in said water are killed.

In various embodiments, in the method for growing plants, the water from the water circuit system may be fed to the apparatus for purifying the water 941 for a time period such that it is ensured that fungi, protists, bacteria and/or algae present in the water are killed. In other words, the water from the water circuit system may be fed to the apparatus for purifying the water 941 for a time period such that it is ensured that all of the water present in the water circuit system is irradiated by means of the illuminant 952.

Here, the throughflow speed through the intermediate space 948 of the apparatus for purifying the water 941 in the water circuit system (see 310 in FIG. 3) may be set by means of the water circuit pump (see 314 in FIG. 3) with a predefined pump power, which may be varied in a range from for example approximately 4 l/min to approximately 10 l/min, for example such that, in the case of the above-mentioned exposure time in a range from approximately 19 s to approximately 21 s required for sterilizing the water quantity of approximately 0.14 l to approximately 0.15 l present in the purification pipe, and a water quantity in a range from approximately 17 l to approximately 20 l present in the irrigation apparatus, the water present in the irrigation apparatus is sterilized within a required overall throughflow duration from approximately 35 min (or approximately 0.6 h) to approximately 45 min (or approximately 0.75 h). This means that the entire water quantity in the irrigation apparatus may be completely circulated by pumping for example approximately 8 times to approximately 10 times in this required overall throughflow duration in order to sterilize the water. This corresponds to approximately 8 so-called throughflow cycles to approximately 10 throughflow cycles, wherein a throughflow cycle is the time required for all of the water located in the water circuit system to be pumped once through the purification pipe. The number of throughflow cycles and the corresponding overall throughflow duration is however not restricted to these values, but may be adapted according to various parameters of the apparatus, such as for example the irradiation intensity of the illuminant used, the arrangement of the illuminant in the purification pipe and the average width of the intermediate space between the pipes, and other parameters of the architecture of the apparatus for purifying the water, in order to achieve a thorough sterilization of the water.

For example, the water may be exposed to the irradiation with UV-C light by means of the illuminant 952 for a duration (or time period) in a range from approximately 0.25 h to approximately 1.5 h, for example in a range from approximately 0.5 h to approximately 1 h, for example in a range from approximately 0.6 h to approximately 0.75 h. In other words, the water may be irradiated with light in the UV-C range for a duration (or time period) in a range from approximately 0.25 h to approximately 1.5 h, for example in a range from approximately 0.5 h to approximately 1 h, for example in a range from approximately 0.6 h to approximately 0.75 h by means of the illuminant 952. To protect the user, the irradiation of the water for the purposes of killing fungi, protists, bacteria and/or algae may be performed at night.

Here, the time period required for killing the fungi, protists, bacteria and/or algae present in the water of the water circuit system may be broken up into cycles. For example, the time period required for killing the fungi, protists, bacteria and/or algae located in the water of the water circuit system may be broken up into approximately 5 cycles to approximately 20 cycles, for example into approximately 8 cycles to approximately 15 cycles, for example into approximately 9 cycles to approximately 10 cycles. Here, a cycle may correspond to an abovementioned throughflow cycle, wherein, for example, the water quantity present in the water circuit system may be completely circulated by pumping once in one throughflow cycle. Alternatively, other cycles or other throughflow cycles may also be defined in order to ensure thorough sterilization of the water. It is to be noted that it may be necessary, depending on the arrangement of the illuminant 952 in the purification pipe 945, on the pumping speed of the water in the individual circuit for purifying the water and thus on the dwell time of the water in the intermediate space 948, on the irradiation intensity, on the number of fungi, protists, bacteria and/or algae in the water, and on other parameters, to adapt the duration and/or the number of cycles required for killing the fungi, protists, bacteria and/or algae by means of the control unit.

As described above, by means of the irradiation of the water with light in the UV-C range in the method for growing plants, fungi, protists, bacteria and/or algae growing in the water may be killed. In other words, the water in the irrigation apparatus may be sterilized by means of the irradiation of the water with light in the UV-C range.

In the method, in various embodiments, for the purposes of purification, the water may be conducted by means of the control unit into an individual circuit of the water circuit system. Said individual circuit may correspond to the individual circuit 440 described with reference to FIG. 4, and may correspond to the individual circuit 740 described with reference to FIG. 7.

FIG. 11 shows a cross-sectional view of the apparatus for growing plants according to various embodiments from a lateral perspective.

As illustrated in FIG. 11, in various embodiments, the apparatus for growing plants 1100 includes a cabinet-like housing 1110, which is illustrated here from a lateral perspective obliquely from the rear in a cross-sectional view. A door of the housing 1110 has been omitted in this illustration for the sake of simplicity.

The housing 1110 includes an accommodating space 1112 in which, for example, as illustrated here, two irrigation troughs 1122 may be accommodated. On the irrigation troughs 1122, there may be arranged mat carriers 1154, onto which corresponding seed mats (not illustrated) may be placed, wherein the seed mats may include seeds (not illustrated) from which plants (not illustrated) may grow.

Above each of the irrigation troughs 1122, an illumination device 1130 may respectively be arranged. A water tank 1113 of an irrigation apparatus (not illustrated) may be provided in a base 1114 of the housing 1110. Furthermore, a control unit (not illustrated) may be arranged in the base 1114.

The apparatus 1100 may furthermore include a climate control device 1140, the elements of which, as illustrated in FIG. 11, may be arranged at least partially on a rear side wall 1105 of the housing 1110.

FIG. 12 shows a cross-sectional view of the apparatus for growing plants according to various embodiments from a frontal perspective.

As illustrated in FIG. 12, in various embodiments, the apparatus for growing plants 1200 has a cabinet-like housing 1210, which is illustrated here from a frontal perspective obliquely from the side in a cross-sectional view. A door of the housing 1210 has been omitted in this illustration for the sake of simplicity.

The housing 1210 includes an accommodating space 1212, which may be designed to accommodate at least one drawer-like growing unit (not illustrated). As can be seen from FIG. 12, side walls 1203 of the housing 1210 may include guide rails 1204 for accommodating the growing units (not illustrated).

Furthermore, the housing 1210 includes a base 1214, in which, for example, a water tank (not illustrated) may be accommodated. A sensor 1216 for determining a conductance of the water and for determining the water level in the water tank (not illustrated) may be provided on a rear-side wall of the base 1214.

On a side wall 1203 of the housing 1210, there may furthermore be provided a further sensor 1218 for determining an ambient temperature.

The housing 1210 may furthermore include a door sensor 1219, wherein the door sensor 1219 is configured to determine whether a door (not illustrated) of the apparatus for growing plants 1200 is open or closed. The door sensor 1219 may for example include an IR sensor 1219. In various embodiments, signals of the door sensor 1219 may be fed to the control unit (not illustrated). The control unit may be configured to, when the door is open, actuate the irrigation apparatus such that no water is circulated by pumping in the water circuit system, and, when the door is closed, actuate the irrigation apparatus such that water from the water tank (not illustrated) is circulated by pumping in the water circuit system.

Correspondingly, in the method for growing plants, it may furthermore be determined, by means of the door sensor 1219, whether a door (not illustrated) of the apparatus 1200 is open or closed. The door sensor 1219 may optionally be an IR sensor 1219. In the method for growing plants, the control unit (not illustrated) may receive signals from the door sensor 1219. The control unit may then, when the door is open, actuate the irrigation apparatus such that no water is circulated by pumping in the water circuit system, and may, when the door is closed, actuate the irrigation apparatus such that water from the water tank is circulated by pumping in the water circuit system.

For example, the control unit may actuate the water circuit system such that, when the door is open, no water from the water tank is fed to the irrigation troughs, and, when the door is closed, water from the water tank is fed to the irrigation troughs. Correspondingly, the control unit may actuate the water circuit system such that, when the door is open, no water from the water tank is fed to the apparatus for purifying the water, and, when the door is closed, water from the water tank is fed to the apparatus for purifying the water. In this way, it is possible to prevent water overflowing from or running out of the irrigation troughs in an uncontrolled manner in the event of the door being open during the filling of the irrigation troughs, whereby a consumer, for example when handling the seed mats or plants arranged above the irrigation troughs, is protected from becoming wet.

Altogether, the embodiments, provided here, of the apparatus for growing plants may ensure the provision of an environment in which plants, such as for example herbs, vegetables, fruit and salad, may be grown from seeds on a scale that is also practicable in modern kitchens. In this way, by means of the present apparatus, it is made possible for the average consumer to add fresh ingredients to their diet in accordance with their personal preferences, and in doing so to firstly ensure desired quality and secondly limit the effort required for this to the level that is possible in modern working life.

In various embodiments, by means of the provided embodiments of the irrigation apparatus of the present apparatus, it is ensured that the irrigation water used during the germination and growth of the plants has a composition which is particularly beneficial to the plant varieties planted in the apparatus and to the state of said plants, for example to the growth progress thereof.

Here, the particular configuration of the water circuit system, provided in various embodiments, of the present apparatus ensures not only that the plants are fed with the water required for growth but also that, for example, the quality and composition and the nutrient content of said water are monitored and regulated by means of corresponding sensors. Here, in various embodiments, the regulation incorporates, by means of the control unit provided for the purpose, not only the measured values of the various sensors but e.g. also items of information relating to the introduced plant variety and relating to the state of the plants growing therefrom.

For example, according to various embodiments, as a measure for a composition of the water in the irrigation apparatus, the conductance of the water may be considered, which is dependent on the content of, for example, salts, acids and bases, but also of pollutants such as nitrate, in the water. Accordingly, in the present apparatus, in various embodiments, a sensor for determining the conductance is provided, which may furthermore determine a filling level of the water in the irrigation apparatus.

In contrast to the conventional manner of determining the conductance of water by means of electrical resistance measurement (conductometry), such as is conventional for example in reverse osmosis installations, in aquaristics, in swimming pools and in drinking water analysis, the sensor that is provided in various embodiments in the present case may have the effect of determining the conductance capacitively. By means of the sensor provided in the present case, it is consequently possible for the conductance and the filling level of the water to be determined contactlessly by means of a combined sensor, whereby the service life of the electrodes used may be increased.

Furthermore, with the irrigation apparatus provided in various embodiments, the additionally provided apparatus for purifying the water provides a further possibility for keeping the quality of the water as constant as possible. For this purpose, by means of the apparatus for purifying the water, said water is sterilized and it is thus ensured that the water quality in the water circuit system does not change owing to the growth of protists, bacteria, fungi and/or algae in a manner detrimental to the plants.

In various embodiments, an apparatus for growing plants is provided, which includes an irrigation apparatus, an accommodating space for accommodating one or more seed mats, and a control unit which is configured to control the irrigation apparatus by means of a program controller. Here, in various embodiments, the irrigation apparatus includes a water circuit system for feeding water to the seed mats, wherein the water circuit system includes at least one inlet, a water tank, at least one water circuit pump and at least one outlet. Furthermore, the irrigation apparatus includes a sensor which is configured to determine a conductance of the fed water.

In various embodiments, the irrigation apparatus is configured to feed required nutrients to the plants with the water.

The control unit may be configured to control or regulate, or in other words vary, the composition of the water by means of the program controller.

The control unit may be configured to have measured values from the sensor supplied thereto. In other words, the control unit may be configured to receive measured values from the sensor. The sensor may be configured to supply, or in other words transmit, measured values to the control unit.

In various embodiments, the control unit is configured to control or regulate, or in other words vary, the irrigation apparatus such that the water has a set composition.

In various embodiments, the irrigation apparatus is furthermore configured to purify the water.

The irrigation apparatus may be configured to feed water of a consistent quality to the plants.

In various embodiments, the sensor is furthermore configured to determine a water level in the tank of the irrigation apparatus.

The sensor may be configured to contactlessly determine the conductance and the water level of the water.

In various embodiments, the sensor is a capacitive sensor.

The control unit may be configured to generate and output a warning signal if the water level in the water tank falls below a certain value.

In various embodiments, the irrigation apparatus includes one or more irrigation troughs, which are respectively arranged under the seed mats, and is configured to feed water from the water tank to the one or more irrigation troughs.

The irrigation apparatus may be configured to feed water to the irrigation troughs at regular intervals.

In various embodiments, the seed mats include seeds, wherein plants may grow from the seeds.

In various embodiments, the apparatus furthermore includes a camera for recording images of the seed mats accommodated in the accommodating space and of the plants growing from the seeds.

In various embodiments, the control unit includes a pattern recognition apparatus and an associated pattern recognition memory and is configured to transmit signals from the camera to the program controller.

The control unit may be configured to, by means of the pattern recognition apparatus, compare the images recorded by means of the camera with one or more reference images stored in the pattern recognition memory in order to determine a state of the plants accommodated in the accommodating space in order to thus adapt the program controller to the respective plant and to the state of said plant.

The control unit may furthermore be configured to adapt the intervals for feeding the irrigation troughs with water to the respective seeds that have been introduced into the accommodating space and/or to the state of the plants growing from the seeds.

In various embodiments, the irrigation troughs include an overflow notch, which is configured to allow excess water to run out of the irrigation troughs, and an outlet, which is configured to allow the water to drain completely from the irrigation troughs.

In various embodiments, the irrigation apparatus furthermore includes: at least one storage container for storing mineral fertilizer and/or organic fertilizer and/or acid and/or base; and at least one pump for feeding the mineral fertilizer and/or the organic fertilizer and/or the acid and/or the base into the water circuit system. Here, the pump is optionally a peristaltic pump.

The control unit may be configured to regulate a nutrient content of the water on the basis of the conductance of the water.

In various embodiments, the control unit is configured to actuate the pumps on the basis of the values determined for the conductance of the water such that said pumps dispense mineral fertilizer and/or organic fertilizer and/or acid and/or base into the water circuit system.

The control unit may be configured to set a regulating variable for the nutrient content on the basis of the plants introduced into the accommodating space and/or of the state of said plants.

In various embodiments, the irrigation apparatus furthermore includes a four-way valve and one or more individual circuits, wherein the four-way valve is configured to feed the water to the one or more individual circuits.

In various embodiments, the water circuit system includes an individual circuit for each irrigation trough and an individual circuit for the purification of the water.

In various embodiments, the irrigation apparatus furthermore includes a temperature sensor.

In various embodiments, the sensor and the temperature sensor are arranged in one housing.

In various embodiments, the temperature sensor includes an NTC thermistor.

In various embodiments, the irrigation apparatus furthermore includes at least one filter, which is configured to collect plant residues and/or nutrient deposits in the water circuit system.

In various embodiments, the irrigation apparatus furthermore includes an apparatus for purifying the water.

In various embodiments, the apparatus for purifying the water is configured to purify the water by irradiation with light in the UV-C range.

In various embodiments, the apparatus furthermore includes a door sensor for determining whether a door of the apparatus is open or closed, wherein the door sensor is optionally an IR sensor.

The control unit may be configured to receive signals from the door sensor.

The control unit may be configured to, when the door is open, actuate the irrigation apparatus such that no water is circulated by pumping in the water circuit system, and may be configured to, when the door is closed, actuate the irrigation apparatus such that water is circulated by pumping in the water circuit system.

In various embodiments, a method for growing plants is provided, the method including: introducing one or more seed mats into an accommodating space of an apparatus for growing plants; controlling an irrigation apparatus by means of a program controller of a control unit, wherein the irrigation unit includes a water circuit system; feeding water to the seed mats by means of the water circuit system, which includes at least one inlet, a water tank, at least one water circuit pump and at least one outlet, and determining a conductance of the fed water by means of a sensor.

The method may furthermore include determining a water level in the water tank of the irrigation apparatus.

In various embodiments, the conductance of the water and the water level in the water tank are determined by means of the same sensor.

In various embodiments, the conductance of the water and the water level in the water tank are determined contactlessly.

The conductance of the water and the water level in the water tank may for example be determined capacitively.

In various embodiments, the method furthermore includes feeding measured values of the sensor to the control unit.

In various embodiments, the method furthermore includes generating and outputting a warning signal if the water level in the water tank falls below a certain value.

In various embodiments, the method furthermore includes feeding water by means of the irrigation apparatus from the water tank to one or more irrigation troughs of the irrigation apparatus, wherein the irrigation troughs are respectively arranged under the seed mats.

The irrigation apparatus may feed water to the irrigation troughs at regular intervals.

In various embodiments, the method furthermore includes introducing seeds onto the seed mats, wherein plants may grow from the seeds.

In various embodiments, the method furthermore includes recording, by means of a camera, images of the seed mats accommodated in the accommodating space and of the plants growing from the seeds.

In various embodiments, the method furthermore includes: transmitting signals from the camera to the program controller; comparing the images recorded by means of the camera with one or more reference images stored in a pattern recognition memory of the control unit in order, by means of a pattern recognition apparatus of the control unit, to determine a state of the plants accommodated in the accommodating space; and adapting the program controller to the respective plant and to the state of said plant.

The control device may adapt the intervals to the respective seeds and/or to the state of the plants that have been introduced into the accommodating space.

The irrigation troughs may be completely filled with water once in every interval.

In various embodiments, after the filling process, via an outlet located on each of the irrigation troughs, the water drains completely from the irrigation trough again and flows back into the water tank.

In various embodiments, the method furthermore includes feeding mineral fertilizer and/or organic fertilizer and/or acid and/or base to the water in the water circuit system by means of at least one pump, wherein the pump is optionally a peristaltic pump.

The control unit may actuate the pumps such that said pumps feed mineral fertilizer and/or organic fertilizer and/or acid and/or base to the water circuit system on the basis of the values determined for the conductance of the water.

The control unit may set a nutrient content of the water on the basis of the conductance of the water.

The control unit may set a regulating variable for the nutrient content on the basis of the plants introduced into the accommodating space, and/or of the state of said plants.

In various embodiments, the irrigation apparatus feeds the water to one or more individual circuits of the water circuit system by means of a four-way valve.

In various embodiments, the control unit controls the irrigation apparatus such that the water is fed to an individual circuit for each irrigation trough and/or to an individual circuit for the purification of the water.

In various embodiments, the method furthermore includes determining a water temperature by means of a temperature sensor, wherein the temperature sensor is optionally an NTC thermistor.

In various embodiments, the method furthermore includes filtering the water in the water circuit system, such that plant residues and/or nutrient deposits in the water circuit system are collected.

In various embodiments, the method furthermore includes purifying the water by means of an apparatus in the irrigation apparatus.

The apparatus for purifying the water may purify the water by irradiation with light in the UV-C range.

In various embodiments, the method furthermore includes determining whether a door of the apparatus is open or closed by means of a door sensor, wherein the door sensor is optionally an IR sensor.

The control unit may receive signals from the door sensor.

The control unit may, when the door is open, actuate the irrigation apparatus such that no water is circulated by pumping in the water circuit system, and may, when the door is closed, actuate the irrigation apparatus such that water is circulated by pumping in the water circuit system.

In various embodiments, an apparatus for growing plants is provided, the apparatus including: an irrigation apparatus for accommodating and distributing water; an accommodating space for accommodating one or more seed mats; and a control unit, wherein the irrigation apparatus includes an apparatus for purifying the water.

The apparatus for purifying the water may be configured to purify the water by irradiation with light in the UV-C range.

The apparatus for purifying the water may be configured to emit light in a wavelength range of approximately 200 nm to approximately 280 nm.

In various embodiments, the apparatus for purifying the water is configured to kill protists, bacteria, fungi and/or algae by irradiation with light in the UV-C range.

In various embodiments, the water circuit system includes one or more individual circuits, wherein the apparatus for purifying the water is arranged in a dedicated individual circuit of the water circuit system.

The control unit may be configured to regulate an irradiation duration for which the water is irradiated with light in the UV-C range, and is configured to regulate an irradiation intensity with which the water is irradiated with light in the UV-C range.

In various embodiments, a method for growing plants is provided, including: introducing one or more seed mats into an accommodating space of an apparatus for growing plants; controlling an irrigation apparatus by means of a program controller of a control unit, wherein the irrigation unit includes a water circuit system and water; and purifying the water in the irrigation apparatus.

The water in the irrigation apparatus may for example be purified by irradiation of the water with light in the UV-C range.

In various embodiments, the water in the irrigation apparatus is purified by irradiation of the water with light in a wavelength range of approximately 200 nm to approximately 280 nm.

Protists, bacteria, fungi and/or algae may be killed by means of the irradiation of the water with light in the UV-C range.

In various embodiments, for the purposes of purification, the water is conducted by means of the control unit into a dedicated individual circuit of the water circuit system.

In various embodiments, the control unit regulates an irradiation duration for the purification of the water and regulates an irradiation intensity for the purification of the water.

In various embodiments, the control unit is furthermore configured to control a climate control apparatus by means of the program controller, wherein the program controller includes climate control data adapted individually to one or more seed mats accommodated in the accommodating space.

In various embodiments, for the program controller, a data memory is provided from which the illumination and/or irrigation and/or climate control data adapted individually to the seeds can be accessed, wherein the data memory may be provided as an external data memory by means of an Internet connection provided in the apparatus.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An apparatus for growing plants, comprising:
an irrigation apparatus;
an accommodating space for accommodating one or more seed mats; and
a control unit which is configured to control the irrigation apparatus by a program controller; and
a door sensor for determining whether a door of the apparatus is open or closed;
wherein the irrigation apparatus comprises a water circuit system for feeding water to the seed mats, wherein the water circuit system comprises at least one inlet, a water tank, at least one water circuit pump and at least one outlet;
wherein the irrigation apparatus comprises a sensor which is configured to determine a conductance of the fed water;
wherein the control unit is configured to, when the door is open, actuate the irrigation apparatus such that no water is circulated by pumping in the water circuit system; and
wherein the control unit is configured to, when the door is closed, actuate the irrigation apparatus such that water from the water tank is circulated by pumping in the water circuit system.

2. The apparatus of claim 1,
wherein the sensor is furthermore configured to determine a water level in the water tank of the irrigation apparatus.

3. The apparatus of claim 1,
wherein the sensor is designed to contactlessly determine the conductance and the water level of the water.

4. The apparatus of claim 3,
wherein the sensor is a capacitive sensor.

5. The apparatus of claim 1,
wherein the control unit is configured to receive measured values from the sensor.

6. The apparatus of claim 1,
wherein the irrigation apparatus comprises one or more irrigation troughs, which are respectively arranged under the seed mats, and is configured to feed water from the water tank to the one or more irrigation troughs.

7. The apparatus of claim 1,
wherein the irrigation apparatus furthermore comprises:
at least one storage container for storing at least one of mineral fertilizer, or organic fertilizer, or acid, or base; and at least one pump for feeding at least one of the mineral fertilizer, or the organic fertilizer, or the acid, or the base into the water circuit system.

8. The apparatus of claim 7,
wherein the pump is a peristaltic pump.

9. The apparatus of claim 1,
wherein the control unit is configured to regulate a nutrient content of the water on the basis of the conductance of the water.

10. The apparatus of claim 9,
wherein the control unit is configured to set a regulating variable for the nutrient content on the basis of at least one of the plants introduced into the accommodating space or of the state of said plants.

11. The apparatus of claim 1,
wherein the irrigation apparatus furthermore comprises an apparatus for purifying the water.

12. The apparatus of claim 11,
wherein the apparatus for purifying the water is configured to purify the water by irradiation with light in the UV-C range.

13. A method for growing plants, the method comprising:
introducing one or more seed mats into an accommodating space of an apparatus for growing plants;
actuating an irrigation apparatus by means of a program controller of a control unit, wherein the irrigation unit comprises a water circuit system;
feeding water to the seed mats by means of the water circuit system, which comprises at least one inlet, a water tank, at least one water circuit pump and at least one outlet;
determining, by means of a door sensor, whether a door of the apparatus is open or closed;
when the door is open, actuate the irrigation apparatus such that no water is circulated by pumping in the water circuit system, by means of the control unit;
when the door is closed, actuating the irrigation apparatus such that water from the water tank is circulated by pumping in the water circuit system, by means of the control unit; and
determining a conductance of the fed water by means of a sensor.

14. The method of claim 13, further comprising:
determining a water level in the water tank of the irrigation apparatus.

15. The method of claim 14,
wherein the conductance of the water and the water level in the water tank are determined by the same sensor.

16. The method of claim 14,
wherein the conductance of the water and the water level in the water tank are determined contactlessly.

17. The method of claim 16,
wherein the conductance of the water and the water level in the water tank are determined capacitively.

18. The method of claim 13, further comprising:
feeding measured values of the sensor to the control unit.

19. The method of claim 13, further comprising:
feeding at least one of mineral fertilizer, or organic fertilizer, or acid, or base to the water in the water circuit system by at least one pump.

20. The method of claim 13, further comprising:
purifying the water by an apparatus for purifying the water in the irrigation apparatus.

* * * * *